(12) United States Patent
Nagata

(10) Patent No.: US 6,671,099 B2
(45) Date of Patent: Dec. 30, 2003

(54) IMAGE-FORMING OPTICAL SYSTEM

(75) Inventor: Tetsuo Nagata, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/025,896

(22) Filed: Dec. 26, 2001

(65) Prior Publication Data

US 2002/0159158 A1 Oct. 31, 2002

(30) Foreign Application Priority Data

Dec. 25, 2000 (JP) .......................... 2000-392116

(51) Int. Cl.$^7$ ................................ G02B 27/14
(52) U.S. Cl. .................. 359/629; 359/630; 359/631; 359/637
(58) Field of Search ................ 359/625, 627, 359/629, 630, 631, 637, 638, 640, 720, 831, 833, 834

(56) References Cited

U.S. PATENT DOCUMENTS

| 6,094,315 | A | * | 7/2000 | Aoki | 359/731 |
| 6,201,646 | B1 | * | 3/2001 | Togino et al. | 359/629 |
| 6,222,676 | B1 | * | 4/2001 | Togino et al. | 359/630 |
| 6,327,094 | B1 | * | 12/2001 | Aoki | 359/637 |
| 6,462,881 | B2 | * | 10/2002 | Takeyama | 359/630 |

FOREIGN PATENT DOCUMENTS

| JP | 8-292371 | 11/1996 |
| JP | 9-90229 | 4/1997 |
| JP | 9-211331 | 8/1997 |
| JP | 10-20196 | 1/1998 |
| JP | 10-06884 | 3/1998 |
| JP | 2000-111800 | 4/2000 |

* cited by examiner

*Primary Examiner*—Ricky Mack
*Assistant Examiner*—Brandi N Thomas
(74) *Attorney, Agent, or Firm*—Pillsbury Winthrop LLP

(57) ABSTRACT

A high-performance and low-cost image-forming optical system has a reduced number of constituent optical elements and is made extremely thin, particularly in a direction perpendicular to an image pickup device, by folding an optical path using only three reflecting surfaces. The image-forming optical system has a front unit including a first prism 10, an aperture stop 2, and a rear unit including a second prism 20. The first prism 10 has a first transmitting surface 11, a first reflecting surface 12, and a second transmitting surface 13. The second prism 20 has a first transmitting surface 21, a first reflecting surface 22, a second reflecting surface 23, and a second transmitting surface 24. An optical path incident on the first reflecting surface 22 and an optical path exiting from the second reflecting surface 23 intersect each other. The first reflecting surface 12 of the first prism 10 and the first and second reflecting surfaces 22 and 23 of the second prism 20 have a curved surface configuration that gives a power to a light beam. The curved surface configuration is a rotationally asymmetric surface configuration that corrects aberrations due to decentration.

21 Claims, 14 Drawing Sheets

IMAGE-FORMING OPTICAL SYSTEM

This application claims benefit of Japanese Application No. 2000-392116 filed in Japan on Dec. 25, 2000, the contents of which are incorporated by this reference.

BACKGROUND OF THE INVENTION

1. Field of the Invention

The present invention relates to image-forming optical systems. More particularly, the present invention relates to a decentered optical system with a reflecting surface having a power for use in optical apparatus using a small-sized image pickup device, e.g. video cameras, digital still cameras, film scanners, and endoscopes.

2. Discussion of Related Art

Recently, with the achievement of small-sized image pickup devices, image-forming optical systems for use in video cameras, digital still cameras, film scanners, endoscopes, etc. have also been demanded to be reduced in size and weight and also in cost. Further, there have recently been commercially available portable telephones, PDAs and notebook personal computers that have built-in electronic image pickup optical systems. Accordingly, there are strong demands that such optical systems should be further reduced in thickness.

Under these circumstances, there have recently been proposed optical systems designed to be compact and thin by giving a power to a reflecting surface, which produces no chromatic aberration, and folding an optical path in the optical axis direction.

Japanese Patent Application Unexamined Publication Numbers (hereinafter referred to as "JP(A)") Hei 8-292371, 9-90229 and 10-68884 each disclose an optical system in which an optical path is folded by a single prism or a plurality of mirrors integrated into a single block, and an image is relayed in the optical system to form a final image.

In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably.

JP(A) Hei 9-211331 discloses an example of an optical system in which no relay image is formed. In this example, an optical path is folded by using a single prism to achieve a reduction in size of the optical system. However, the optical system has an extremely narrow photographic field angle and is not satisfactorily corrected for aberrations.

JP(A) Hei 10-20196 discloses a zoom lens system as an example of an optical system using two prisms, in which no relay image is formed. The zoom lens system comprises two units, i.e. a positive front unit and a negative rear unit. The positive front unit includes a prism of negative power placed on the object side of a stop and a prism of positive power placed on the image side of the stop. JP(A) Hei 10-20196 also discloses an example in which the positive front unit, which comprises a prism of negative power and a prism of positive power, is divided into two to form a three-unit zoom lens system having a negative unit, a positive unit and a negative unit. In these examples, however, the zoom lens systems are not approximately telecentric on the image side and hence incapable of being applied to optical systems using image pickup devices such as CCDs. Further, because the two prisms have a total of four reflecting surfaces, manufacturing tolerances are tightened, causing costs to increase unfavorably. Further, if two reflecting surfaces are used in the prism positioned on the object side of the aperture stop, the height of extra-axial rays becomes high, causing the prism to become large in size undesirably.

JP(A) 2000-111800 also discloses lens systems each using two prisms. However, these lens systems are not satisfactorily thin and compact. Further, an image pickup device (image plane) is not placed at right angles to the photographing direction. All things considered, including the substrate of the image pickup device, it is difficult to form a very thin image pickup unit.

When a general refracting optical system is used to obtain a desired refracting power, chromatic aberration occurs at an interface surface thereof according to chromatic dispersion characteristics of an optical element. To correct the chromatic aberration and also correct other ray aberrations, the refracting optical system needs a large number of constituent elements, causing costs to increase. In addition, because the optical path extends straight along the optical axis, the entire optical system undesirably lengthens in the direction of the optical axis, resulting in an unfavorably large-sized image pickup apparatus.

In decentered optical systems such as those described above in regard to the prior art, an imaged figure or the like is undesirably distorted and the correct shape cannot be reproduced unless the formed image is favorably corrected for aberrations, particularly rotationally asymmetric distortion.

Furthermore, in a case where a reflecting surface is used in a decentered optical system, the sensitivity to decentration errors of the reflecting surface is several times as high as that in the case of a refracting surface, and as the number of reflections increases, decentration errors that are transferred while being added up increase correspondingly. Consequently, manufacturing accuracy and assembly accuracy, e.g. surface accuracy and decentration accuracy, required for reflecting surfaces become even more strict.

SUMMARY OF THE INVENTION

The present invention was made in view of the above-described problems with the prior art.

Accordingly, an object of the present invention is to provide a high-performance and low-cost image-forming optical system having a reduced number of constituent optical elements.

Another object of the present invention is to provide a high-performance image-forming optical system that is made extremely thin, particularly in a direction perpendicular to an image pickup device, by folding an optical path using only three reflecting surfaces.

To attain the above-described objects, the present invention provides an image-forming optical system having a positive refracting power as a whole for forming an object image. The image-forming optical system has a first prism and a second prism, each of which is formed from a medium having a refractive index (n) larger than 1.3 (n>1.3). The image-forming optical system includes, in order from the object side, a front unit including at least the first prism, an aperture stop, and a rear unit including the second prism. The image-forming optical system does not form an intermediate image. The first prism has three optical functional surfaces transmitting or reflecting a light beam. When the three optical functional surfaces are defined as a first-first surface, a first-second surface, and a first-third surface, respectively, the first-first surface allows a light beam from the object side to enter the first prism through it. The first-second surface reflects the light beam entering through the first-first surface within the first prism. The first-third surface allows the light beam reflected from the first-second surface to exit the first prism through it. The second prism has four optical functional surfaces transmitting or reflecting a light beam. When the four optical functional surfaces are defined as a second-first surface, a second-second surface, a second-third surface, and a second-fourth surface, respectively, the second-first surface allows a light beam from the object side to enter the second prism through it. The second-second surface reflects the light beam entering through the second-first surface within the second prism. The second-third surface reflects the light beam reflected from the second-second surface within the second prism. The second-fourth surface allows the light beam reflected from the second-third surface to exit the second prism through it. The second-first surface and the second-second surface are disposed to face each other across the above-described medium. The second-third surface and the second-fourth surface are disposed to face each other across the medium. An optical path connecting the second-first surface and the second-second surface intersects an optical path connecting the second-third surface and the second-fourth surface. The first-second surface of the first prism has a rotationally asymmetric surface configuration that gives a power to a light beam and corrects aberrations due to decentration. The second-second surface and the second-third surface of the second prism have a curved surface configuration that gives a power to a light beam. The curved surface configuration is a rotationally asymmetric surface configuration that corrects aberrations due to decentration.

The reasons for adopting the above-described arrangement in the present invention, together with the function thereof, will be described below in order.

The image-forming optical system according to the present invention, which is provided to attain the above-described objects, has a first prism and a second prism, each of which is formed from a medium having a refractive index (n) larger than 1.3 (n>1.3). The image-forming optical system includes, in order from the object side, a front unit including at least the first prism, an aperture stop, and a rear unit including the second prism. The image-forming optical system does not form an intermediate image.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the relative positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, an image-forming optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

Accordingly, the present invention adopts an arrangement in which two prisms are placed and which takes into full consideration the symmetry with respect to the stop, thereby enabling not only axial aberrations but also off-axis aberrations to be favorably corrected. In the case of an arrangement using only one prism, asymmetry with respect to the stop increases, and off-axis aberrations are aggravated unavoidably.

For the reasons stated above, the present invention adopts a basic arrangement in which the image-forming optical system has a first prism and a second prism and includes, in order from the object side, a front unit including at least the first prism, an aperture stop, and a rear unit including the second prism. Moreover, the image-forming optical system does not form an intermediate image.

It should be noted that the image-forming optical system can also be constructed in a thin structure by forming either or both of the two prisms from mirrors alone, as will be clear from Examples (described later).

Further, in the present invention, the first prism placed in the front unit has three optical functional surfaces transmitting or reflecting a light beam. When the three optical functional surfaces are defined as a first-first surface, a first-second surface, and a first-third surface, respectively, the first-first surface allows a light beam from the object side to enter the first prism through it. The first-second surface reflects the light beam entering through the first-first surface within the first prism. The first-third surface allows the light beam reflected from the first-second surface to exit the first prism through it.

If two or more reflecting surfaces are used in the prism positioned on the object side of the aperture stop, the height of extra-axial rays becomes high, causing the prism to become large in size. Therefore, the first prism used in the front unit has only one reflecting surface as stated above. Thus, it is possible to attain reductions in the size and weight of the optical system.

Further, in the present invention, the second prism placed in the rear unit has four optical functional surfaces transmitting or reflecting a light beam. When the four optical functional surfaces are defined as a second-first surface, a second-second surface, a second-third surface, and a second-fourth surface, respectively, the second-first surface allows a light beam from the object side to enter the second prism through it. The second-second surface reflects the light beam entering through the second-first surface within the second prism. The second-third surface reflects the light beam reflected from the second-second surface within the second prism. The second-fourth surface allows the light beam reflected from the second-third surface to exit the second prism through it. The second-first surface and the second-second surface are disposed to face each other across the medium. The second-third surface and the second-fourth surface are disposed to face each other across the medium. An optical path connecting the second-first surface and the second-second surface intersects an optical path connecting the second-third surface and the second-fourth surface.

If a prism in which optical paths intersect each other as stated above is used as the second prism, it is possible to construct the second prism in a compact form. The reason for this is as follows. In a comparison between the prism structure of the present invention and a prism structure of the same two-reflection type which has the same optical path length as that of the above-described prism structure and in which a Z-shaped optical path is formed, the prism structure of the present invention provides a higher space utilization efficiency. In the prism configuration having a Z-shaped optical path, rays within the prism invariably travel through different regions one by one, whereas in the prism in which the optical paths intersect each other, rays pass through the same region twice. Accordingly, the prism can be made compact in size.

Further, in the present invention, the aperture stop is positioned between the front unit including the first prism and the rear unit including the second prism, and the optical system uses only three reflecting surfaces in total. If four or more reflecting surfaces are used, the optical path of the optical system becomes complicated, and, at the same time, assembling tolerances required in the manufacturing process are tightened. This causes the production cost to increase. In contrast, the present invention uses only three reflecting surfaces in total to form the optical system. Therefore, it is possible to attain an extremely low-cost optical system and to correct decentration aberrations favorably.

Further, a combination of two prisms allows construction of an image-forming optical system that is extremely thin as a whole. Further, because an image pickup device can be disposed at right angles to the viewing direction, it becomes easy to integrate the circuit board for driving the image pickup device into an apparatus incorporating the image-forming optical system. Accordingly, the apparatus can be constructed in a slim form.

To form an image-forming optical system from a system having three reflecting surfaces in total as stated above, each reflecting surface is arranged to have a surface configuration that gives a power to a light beam. Further, to correct decentration aberrations due to the fact that each reflecting surface is decentered, each reflecting surface is arranged to have a rotationally asymmetric surface configuration that corrects decentration aberrations.

The above-described rotationally asymmetric surface used in the present invention should preferably be a plane-symmetry free-form surface having only one plane of symmetry. Free-form surfaces used in the present invention are defined, for example, by Equation (a) shown in U.S. Pat. No. 6,124,989 [JP(A) 2000-66105]. The Z-axis of the defining equation is the axis of a free-form surface.

Let us assume that the decentration direction of the image-forming optical system is a Y-axis direction; a plane parallel to the axial principal ray is a YZ-plane; and a direction perpendicularly intersecting the YZ-plane is an X-axis direction. Let us further assume that the power in the X-axis direction of the front unit including the first prism is P1x; the power in the Y-axis direction of the front unit is P1y; the power in the X-axis direction of the rear unit including the second prism is P2x; the power in the Y-axis direction of the rear unit is P2y; the power in the X-axis direction of the image-forming optical system is Px; and the power in the Y-axis direction of the image-forming optical system is Py. In the present invention, it is desirable that the front unit should satisfy the following conditions:

$$-0.5 < P1x/Px < 0.4 \quad (1\text{-}1)$$

$$-0.5 < P1y/Py < 0.4 \quad (2\text{-}1)$$

It should be noted that the power and focal length of the decentered optical system are defined, for example, on the basis of FIG. 15 in U.S. Pat. No. 6,124,989 [JP(A) 2000-66105].

In the conditions (1-1) and (2-1), the power of the front unit is standardized by the power of the image-forming optical system. If P1x/Px or P1y/Py is not larger than the lower limit, i.e. 0.5, the negative power of the front unit becomes very strong, and hence aberrations are aggravated. If this power is assigned mainly to the reflecting surface of the prism, because the ray height, particularly the height of extra-axial principal rays, is high, the amount of comatic decentration aberration produced by the reflecting surface increases unfavorably. If a strong power is given to a refracting surface of the prism or a lens, chromatic aberration occurs to a considerable extent at the refracting surface, causing performance degradation. The chromatic aberration cannot be corrected unless the number of constituent lens elements is increased.

If P1x/Px or P1y/Py is not smaller than the upper limit of each of the conditions (1-1) and (2-1), i.e. 0.4, the power of the front unit becomes a strong positive power, and it becomes very difficult to ensure the required back focus because the second prism, in which there are two reflections, is placed in the rear unit.

It is preferable to satisfy the following conditions:

$$-0.5 < P1x/Px < 0 \quad (1\text{-}2)$$

$$-0.5 < P1y/Py < 0 \quad (2\text{-}2)$$

It is desirable that the rear unit should satisfy the following conditions:

$$0.3 < P2x/Px < 2.0 \quad (3\text{-}1)$$

$$0.3 < P2y/Py < 2.0 \quad (4\text{-}1)$$

In the conditions (3-1) and (4-1), the power of the rear unit is standardized by the power of the image-forming optical system. If P2x/Px or P2y/Py is not larger than the lower limit, i.e. 0.3, the power of the rear unit becomes very weak. Therefore, it becomes impossible to attain a wide-field angle optical system. At the same time, the optical system becomes large in size unfavorably. If the power is given to the front unit, the resulting optical system is not in the form of a retrofocus type comprising a negative front unit and a positive rear unit. Consequently, it becomes extremely difficult to ensure the required back focus.

If P2x/Px or P2y/Py is not smaller than the upper limit of each of the conditions (3-1) and (4-1), i.e. 2.0, the power of the rear unit becomes very strong. Thus, the power of the reflecting surfaces becomes strong. Consequently, aberrations, particularly axial astigmatism and off-axis comatic decentration aberration, occur to a considerable extent, and it is difficult to correct these aberrations.

It is preferable to satisfy the following conditions:

$$0.5 < P2x/Px < 1.5 \quad (3\text{-}2)$$

$$0.5 < P2y/Py < 1.5 \quad (4\text{-}2)$$

Further, it is desirable to satisfy the following condition:

$$70° < \theta < 110° \quad (5\text{-}1)$$

where θ is the angle formed between the axial principal ray incident on the first-second surface and the axial principal ray reflected therefrom.

The condition (5-1) specifies the angle formed between the axial principal ray incident on the reflecting surface of the first prism and the axial principal ray reflected from the reflecting surface. If the angle θ is not smaller than the upper limit of the condition (5-1), i.e. 110°, or not larger than the lower limit, i.e. 70°, the angle at which the axial principal ray enters the second prism deviates largely from an angle at which the axial principal ray is substantially parallel to the image plane (i.e. the axial principal ray is undesirably tilted). Consequently, it becomes impossible to attain a reduction in size of the optical system. In particular, if the angle θ is not larger than the lower limit, the second prism undesirably projects toward the object side to a considerable extent. If the angle θ is not smaller than the upper limit, the image plane has to be tilted to a considerable degree. Alternatively, the optical system has to be arranged so that an extra-axial light beam is incident obliquely on the image plane. Consequently, it becomes impossible to attain a telecentric optical system.

It is preferable to satisfy the following condition:

$$75° < \theta < 100° \quad (5\text{-}2)$$

Further, it is desirable to satisfy the following condition:

$$0.5 < D/f < 2.5 \quad (6\text{-}1)$$

where D is the thickness of the image-forming optical system, and f is the mean focal length of the image-forming optical system.

It should be noted that the term "thickness D of the image-forming optical system" means the thickness of the image-forming optical system measured from the image pickup device in a direction perpendicular to the image pickup device. As shown in FIG. 10, which is a ray path diagram illustrating Example 1 (described later), the thickness D is defined as the distance from the forwardmost ray position A among the rays within the image-forming optical system to the image plane 3. The mean focal length f is defined as f=(fx+fy)/2, where fx is the focal length in the X-axis direction of the image-forming optical system, and fy is the focal length in the Y-axis direction of the image-forming optical system.

In the condition (6-1), the thickness of the image-forming optical system is standardized by the focal length of the image-forming optical system. In the case of a decentered optical system, the optical path can be folded. Further, when the optical system is formed from a first prism and a second prism that are arranged as in the present invention, the optical system can be constructed in a very thin structure within the above-described range. If D/f is not larger than the lower limit of the condition (6-1), i.e. 0.5, it becomes impossible to ensure the required effective surface area and edge wall thickness of each prism. In particular, if the edge wall thickness is not sufficiently ensured, assembleability is degraded, and costs increase unfavorably. If D/f is not smaller than the upper limit of the condition (6-1), i.e. 2.5, the thickness of the optical system increases unfavorably. Therefore, there is no merit in using a decentered optical system to form the image-forming optical system.

It is preferable to satisfy the following condition:

$$0.8 < D/f < 2.3 \quad (6\text{-}2)$$

Further, it is desirable to satisfy the following condition:

$$0.1 < SD1/f < 3.0 \quad (7\text{-}1)$$

where SD1 is the optical path length of the axial principal ray from the first-second surface of the front unit, which is a reflecting surface, to the aperture stop.

In the condition (7-1), the optical path length of the axial principal ray from the first reflecting surface of the front unit to the aperture stop is standardized by the focal length of the image-forming optical system. If SD1/f is not larger than the lower limit of the condition (7-1), i.e. 0.1, it becomes necessary to increase the power of the reflecting surface in order to ensure the desired back focus. As a result, off-axis comatic decentration aberration increases unfavorably. If SD1/f is not smaller than the upper limit of the condition (7-1), i.e. 3.0, the size of the apparatus increases unfavorably although it is possible to ensure the desired back focus without the need to increase the power of the reflecting surface.

It is preferable to satisfy the following condition:

$$0.2 < SD1/f < 2.0 \quad (7\text{-}2)$$

Further, it is desirable to satisfy either of the following conditions:

$$0.5 < SD2/f < 3.0 \quad (8\text{-}1)$$

$$2.0 < SD3/f < 6.0 \quad (9\text{-}1)$$

where SD2 is the optical path length of the axial principal ray from the first surface of the front unit, which is closest to the object side, to the aperture stop, and SD3 is the optical path length of the axial principal ray from the aperture stop to the final surface of the rear unit that is closest to the image side.

It should be noted that the above-described first surface and final surface do not include the surface of a plane-parallel plate that may be provided on the object or image side of the optical system.

In the condition (8-1), the optical path length of the axial principal ray from the first surface of the front unit to the aperture stop is standardized by the focal length of the image-forming optical system. In the condition (9-1), the optical path length of the axial principal ray from the aperture stop to the final surface of the rear unit is standardized by the focal length of the image-forming optical system.

If SD2/f is not larger than the lower limit of the condition (8-1), i.e. 0.5, the optical path length of the axial principal ray becomes excessively short, and it becomes difficult to ensure the required back focus. If SD2/f is not smaller than the upper limit of the condition (8-1), i.e. 3.0, the first prism becomes large in size. As a result, the overall size of the lens system increases unfavorably.

If SD3/f is not larger than the lower limit of the condition (9-1), i.e. 2.0, it becomes difficult to correct decentration aberrations although it is advantageous to ensuring the required back focus. If SD3/f is not smaller than the upper limit of the condition (9-1), i.e. 6.0, the second prism becomes large in size unfavorably, and it becomes impossible to ensure the required back focus.

Regarding the condition (9-1), which is concerned with the optical path length from the aperture stop to the final surface of the rear unit, the optical path length specified by the condition (9-1) is the distance to the image plane in a case where the rear unit is formed from mirrors as in Examples 7 and 8 (described later).

It is preferable to satisfy either of the following conditions:

$$0.8 < SD2/f < 2.5 \quad (8\text{-}2)$$

$$2.0 < SD3/f < 5.0 \quad (9\text{-}2)$$

A finder optical system can be formed by using any of the above-described image-forming optical systems according to the present invention as a finder objective optical system and adding an image-erecting optical system for erecting an object image formed by the finder objective optical system and an ocular optical system.

In addition, an electronic camera apparatus can be constructed by using any of the foregoing image-forming optical systems according to the present invention, an image pickup device placed in an image plane formed by the image-forming optical system, a recording medium for recording image information received by the image pickup device, and an image display device that receives image information from the recording medium or the image pickup device to form an image for observation.

In addition, an endoscope system can be constructed by using an observation system having any of the foregoing image-forming optical systems according to the present invention and an image transmitting member for transmitting an image formed by the image-forming optical system along a longitudinal axis, and an illumination system having an illuminating light source and an illuminating light transmitting member for transmitting illuminating light from the illuminating light source along the longitudinal axis.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 8 of the image-forming optical system according to the present invention will be described below.

It should be noted that constituent parameters of each example will be shown later.

Figure 1:
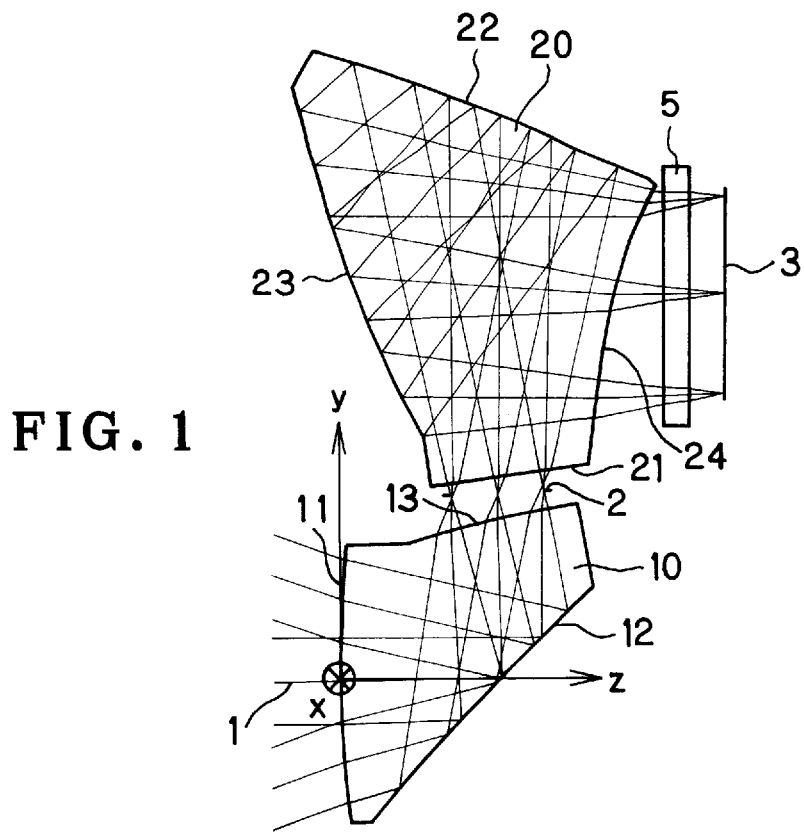
FIG. 1 is a sectional view of an image-forming optical system according to Example 1 of the present invention.

In the constituent parameters of each example, as shown in FIG. 1, an axial principal ray 1 is defined by a ray emanating from the center of an object and passing perpendicularly through the center of a stop 2 to reach the center of an image plane 3 in the forward ray tracing. The position at which the axial principal ray 1 intersects the first surface (first-first surface 11 in FIG. 1) of the optical system that is closest to the object side is defined as the origin of each decentered optical surface of the decentered optical system. A Z-axis is taken in the direction of the axial principal ray 1. The direction in which the Z-axis extends from the object toward the first surface is defined as a positive direction of the Z-axis. A plane in which the optical axis is folded is defined as a YZ-plane. An axis passing through the origin at right angles to the YZ-plane is defined as an X-axis. The direction in which the X-axis extends from the obverse side toward the reverse side of the plane of FIG. 1 is defined as a positive direction of the X-axis. An axis that constitutes a right-handed orthogonal coordinate system in combination with the X- and Z-axes is defined as a Y-axis.

In Examples 1 to 8 (described later), the decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [regarding free-form surfaces, the center axis is the Z-axis of Equation (a) in the cited literature (described later)] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\beta$ counterclockwise about the Y-axis. Then, the center axis of the surface, which has been rotated twice, is rotated through y clockwise about the Z-axis of the new coordinate system.

Among optical functional surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined, for example, by Equation (a) shown in U.S. Pat. No. 6,124,989 [JP(A) 2000-66105]. The Z-axis of the defining equation is the axis of a free-form surface.

In the constituent parameters (shown later), those terms concerning free-form surfaces for which no data is shown are zero. Regarding the refractive index and Abbe's number, those for the spectral d-line (wavelength: 587.56 nanometers) are shown. Lengths are given in millimeters.

EXAMPLE 1

FIG. 1 is a sectional view of Example 1 taken along the YZ-plane containing the axial principal ray. This example has, in order in which light passes from the object side, a first prism 10 constituting a front unit, a stop 2, a second prism 20 constituting a rear unit, a plane-parallel plate 5, e.g. a low-pass filter or an infrared cutoff filter, and an image plane image-formation plane) 3. The first prism 10 comprises a first-first surface 11, a first-second surface 12, and a first-third surface 13. The first-first surface 11 is a first transmitting surface. The first-second surface 12 is a first reflecting surface. The first-third surface 13 is a second transmitting surface. Light rays from the object pass through the first transmitting surface 11 and are internally reflected by the first reflecting surface 12. The reflected rays pass through the second transmitting surface 13. The second prism 20 comprises a second-first surface 21, a second-second surface 22, a second-third surface 23, and a second-fourth surface 24. The second-first surface 21 is a first transmitting surface. The second-second surface 22 is a first reflecting surface. The second-third surface 23 is a second reflecting surface. The second-fourth surface 24 is a second transmitting surface. Light rays from the object pass through the first transmitting surface 21 and are internally reflected by the first reflecting surface 22. The reflected rays are further internally reflected by the second reflecting surface 23 and pass through the second transmitting surface 24. In this image-forming optical system, no intermediate image is formed. In the second prism 20, the second-first surface 21 and the second-second surface 22 are disposed to face each other across the prism medium, and the second-third surface 23 and the second-fourth surface 24 are disposed to face each other across the prism medium. The optical path connecting the second-first surface 21 and the second-second surface 22 intersects the optical path connecting the second-third surface 23 and the second-fourth surface 24 within the second prism 20. The first-first to first-third surfaces 11 to 13 of the first prism 10 and the second-first to second-fourth surfaces 21 to 24 of the second prism 20 are all free-form surfaces

EXAMPLE 2

Figure 2:
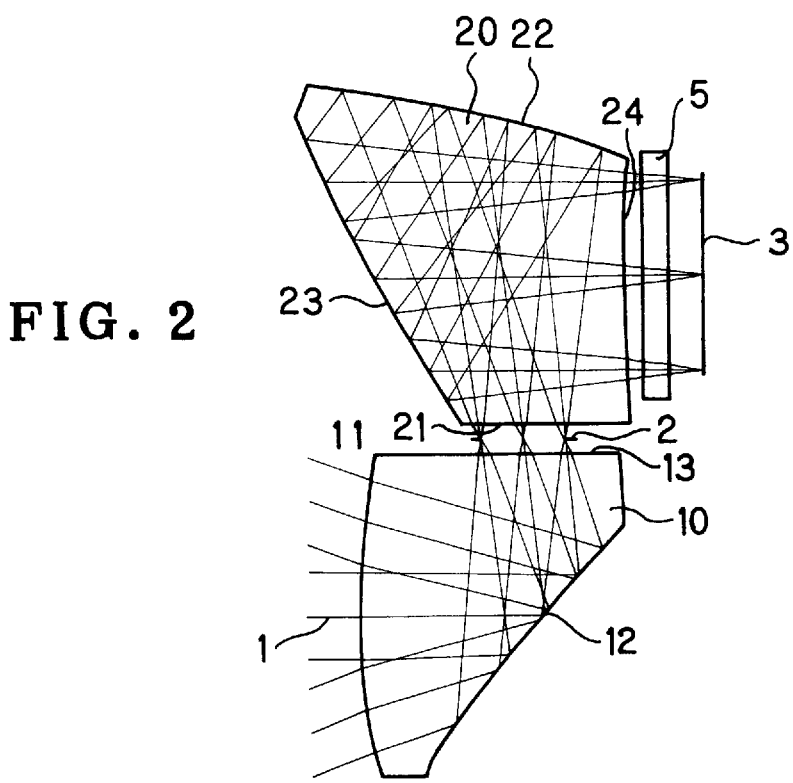
FIG. 2 is a sectional view of an image-forming optical system according to Example 2 of the present invention.

FIG. 2 is a sectional view of Example 2 taken along the YZ-plane containing the axial principal ray. This example has an arrangement similar to that of Example 1. In this example, however, the second transmitting surface 13 of the first prism 10 and the first transmitting surface 21 of the second prism 20 are plane surfaces. The other surfaces of the first and second prisms 10 and 20 are free-form surfaces. When two prisms are used, misalignment between the optical axes of the prisms causes significant performance degradation. Therefore, the mutually opposing surfaces 13 and 21 of the prisms 10 and 20 are formed from plane surfaces. With this arrangement, the alignment of the prisms 10 and 20 is facilitated, and the manufacturing and assembling costs can be reduced.

EXAMPLE 3

Figure 3:
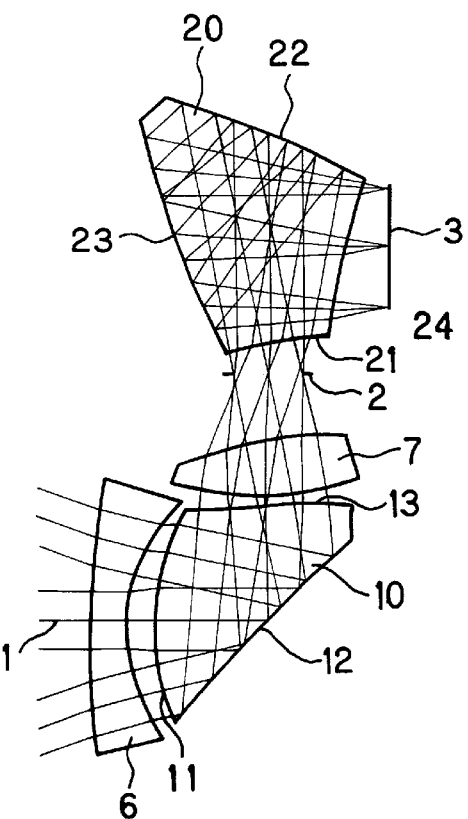
FIG. 3 is a sectional view of an image-forming optical system according to Example 3 of the present invention.

FIG. 3 is a sectional view of Example 3 taken along the YZ-plane containing the axial principal ray. This example has, in order in which light passes from the object side, a negative lens 6, a first prism 10 and a positive lens 7, which constitute a front unit, a stop 2, a second prism 20 constituting a rear unit, and an image plane (image-formation plane) 3. The first prism 10 and the second prism 20 have arrangements similar to those in Example 1. Both surfaces of the negative lens 6, both surfaces of the positive lens 7, the first-first to first-third surfaces 11 to 13 of the first prism 10 and the second-first to second-fourth surfaces 21 to 24 of the second prism 20 are all free-form surfaces. Insertion of rotationally asymmetric lenses 6 and 7 into the front unit makes it possible to attain a high-performance image-forming optical system that is corrected for decentration aberrations even more favorably.

EXAMPLE 4

Figure 4:
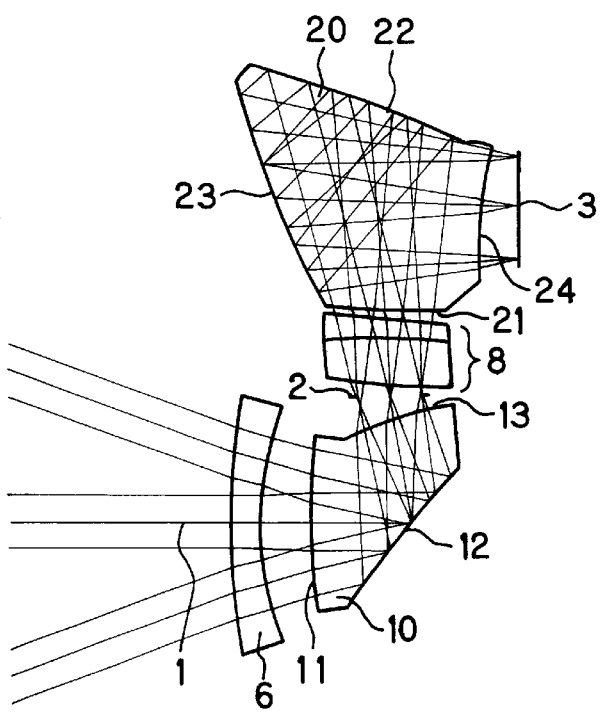
FIG. 4 is a sectional view of an image-forming optical system according to Example 4 of the present invention.

FIG. 4 is a sectional view of Example 4 taken along the YZ-plane containing the axial principal ray. This example has, in order in which light passes from the object side, a negative lens 6 and a first prism 10, which constitute a front unit, a stop 2, a cemented doublet 8 and a second prism 20, which constitute a rear unit, and an image plane (image-formation plane) 3. The first prism and the second prism 20 have arrangements similar to those in Example 1. Both surfaces of the negative lens 6, the first-first to first-third surfaces 11 to 13 of the first prism 10 and the second-first to second-fourth surfaces 21 to 24 of the second prism 20 are all free-form surfaces. The three surfaces of the cemented doublet 8 are spherical surfaces. Even when the prisms 10 and 20 are used, the entrance surfaces 11 and 21 and the exit surfaces 13 and 24 produce not a little chromatic aberration. Therefore, the cemented doublet 8 is inserted into the rear unit. With this arrangement, it is possible to attain a high-performance image-forming optical system that is corrected for chromatic aberration even more favorably.

EXAMPLE 5

Figure 5:
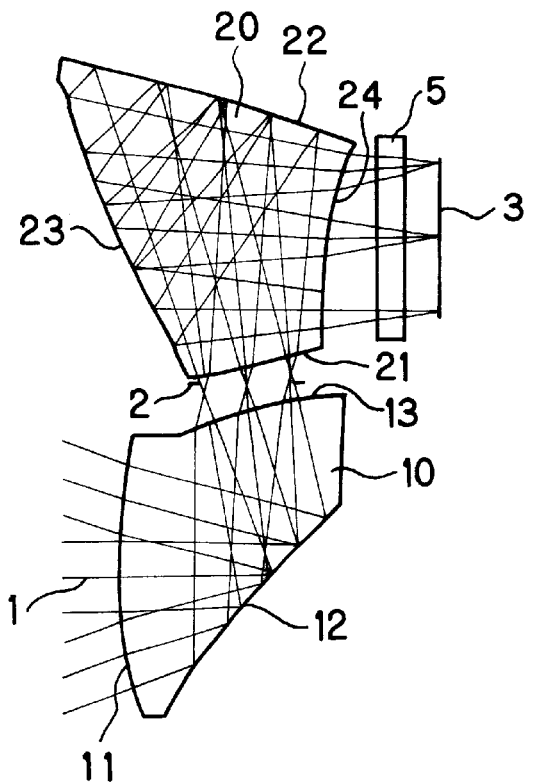
FIG. 5 is a sectional view of an image-forming optical system according to Example 5 of the present invention.

FIG. 5 is a sectional view of Example 5 taken along the YZ-plane containing the axial principal ray. This example has an arrangement similar to that of Example 1. In this example, an image pickup device placed in the image plane (image-formation plane) 3 is reduced in size.

EXAMPLE 6

Figure 6:
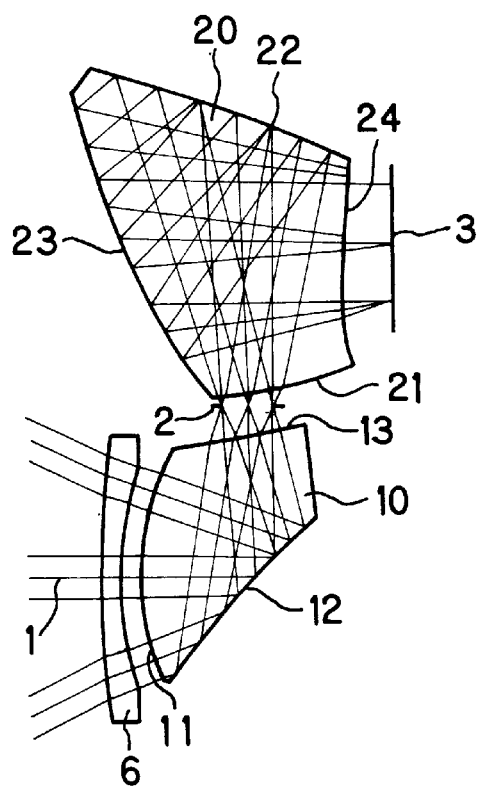
FIG. 6 is a sectional view of an image-forming optical system according to Example 6 of the present invention.

FIG. 6 is a sectional view of Example 6 taken along the YZ-plane containing the axial principal ray. This example has, in order in which light passes from the object side, a negative lens 6 and a first prism 10, which constitute a front unit, a stop 2, a second prism 20 constituting a rear unit, and an image plane (image- formation plane) 3. The first prism 10 and the second prism 20 have arrangements similar to those in Example 1. Both surfaces of the negative lens 6 are spherical surfaces. The first-first to first-third surfaces 11 to 13 of the first prism 10 and the second-first to second-fourth surfaces 21 to 24 of the second prism 20 are all free-form surfaces. In this example, the negative lens 6 is inserted at a position on the object side of the first prism 10 arranged as in Example 5 to provide a wide-field angle image-forming optical system.

EXAMPLE 7

Figure 7:
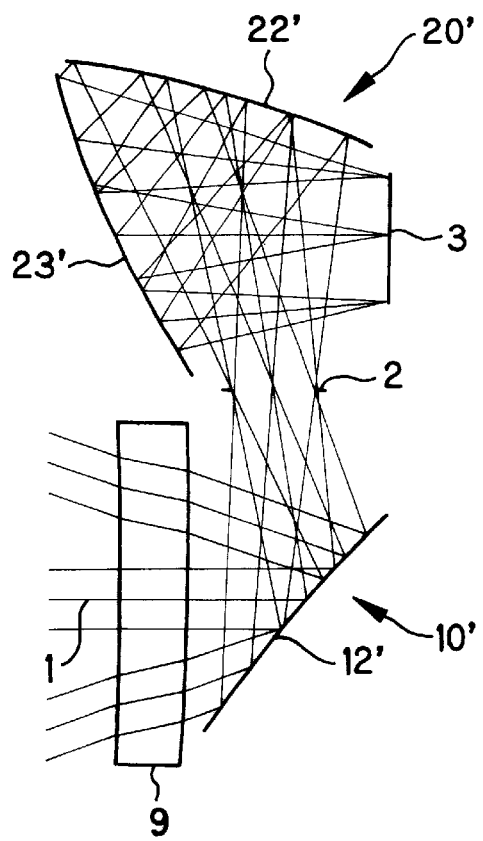
FIG. 7 is a sectional view of an image-forming optical system according to Example 7 of the present invention.

FIG. 7 is a sectional view of Example 7 taken along the YZ-plane containing the axial principal ray. In this example, the first and second prisms are formed from mirrors alone. That is, Example 7 has, in order in which light passes from the object side, a lens 9 and a first reflecting system 10' (corresponding to the first prism), which constitute a front unit, a stop 2, a second reflecting system 20' (corresponding to the second prism) constituting a rear unit, and an image plane (image-formation plane) 3. The first reflecting system 10' consists only of a first reflecting surface 12' corresponding to the first-second surface of the first prism. The second reflecting system 20' consists of a first reflecting surface 22' corresponding to the second-second surface of the second prism and a second reflecting surface 23' corresponding to the second-third surface of the second prism. Light rays from the object are reflected by the first reflecting surface 22' and then reflected by the second reflecting surface 23'. In this image-forming optical system, no intermediate image is formed. In the second reflecting system 20', the optical path incident on the first reflecting surface 22' and the optical path reflected from the second reflecting surface 23' intersect each other. Both surfaces of the lens 9, the first reflecting surface 12' of the first reflecting system 10', and the first and second reflecting surfaces 22' and 23' of the second reflecting system 20' are all free-form surfaces. This image-forming optical system is constructed as a wide-angle lens system.

EXAMPLE 8

Figure 8:
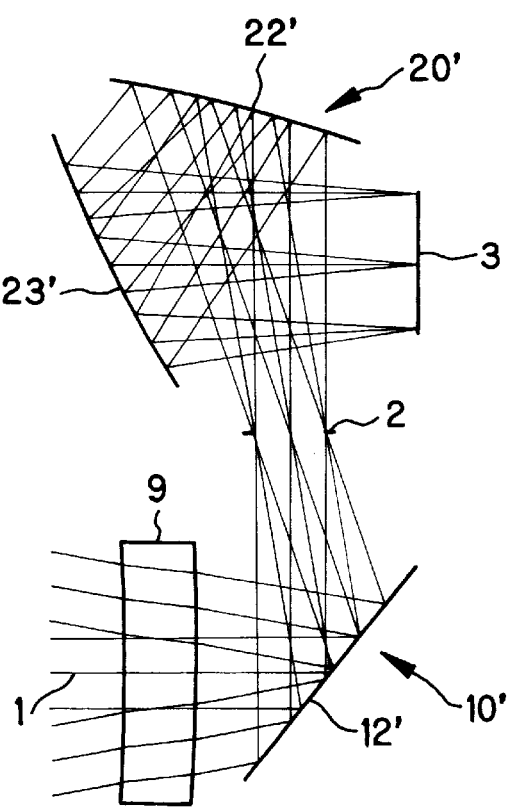
FIG. 8 is a sectional view of an image-forming optical system according to Example 8 of the present invention.

FIG. 8 is a sectional view of Example 8 taken along the YZ-plane containing the axial principal ray. This example has an arrangement similar to that of Example 7. Example 8 differs from Example 7 in that the image-forming optical system is constructed as a telephoto lens system.

In Examples 1 to 4, the size of the image pickup surface is 4.8×3.6 millimeters. The photographic field angles are as follows: The horizontal field angle is 51.3°, and the vertical field angle is 39.6°. The entrance pupil diameter is 1.77 millimeters, and F-number is equivalent to 2.8. In Examples 5 to 8, the size of the image pickup surface is 3.6×2.7 millimeters. In Examples 5 and 7, the photographic field angles are as follows: The horizontal field angle is 50.3°, and the vertical field angle is 39.1°. The entrance pupil diameter is 1.41 millimeters, and F-number is equivalent to 2.8. In Example 6, the photographic field angles are as follows: The horizontal field angle is 64.1°, and the vertical field angle is 50.7°. The entrance pupil diameter is 1.06 millimeters, and F-number is equivalent to 2.8. In Example 8, the photographic field angles are as follows: The horizontal field angle is 26.4°, and the vertical field angle is 20.1°. The entrance pupil diameter is 1.41 millimeters, and F-number is equivalent to 5.6.

The foregoing examples are also applicable to optical systems having sizes other than those mentioned above. Further, the present invention includes not only an image pickup optical system using the image-forming optical system according to the present invention but also an image pickup apparatus and so forth incorporating the optical system.

Numerical data concerning Examples 1 to 8 are shown below. In the tables below, "FFS" denotes a free-form surface, and "RE" denotes a reflecting surface.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | FFS[1] | | | 1.5254 | 55.8 |
| 2 | FFS[2] (RE) | | (1) | 1.5254 | 55.8 |
| 3 | FFS[3] | | (2) | | |
| 4 | ∞ (Stop) | | (3) | | |
| 5 | FFS[4] | | (4) | 1.5254 | 55.8 |
| 6 | FFS[5] (RE) | | (5) | 1.5254 | 55.8 |
| 7 | FFS[6] (RE) | | (6) | 1.5254 | 55.8 |
| 8 | FFS[7] | | (7) | | |
| 9 | ∞ | | (8) | 1.5230 | 55.0 |

-continued

| | | | |
|---|---|---|---|
| 10 | ∞ | | (9) |
| Image plane | ∞ | | (10) |

FFS[1]

| | | | | | |
|---|---|---|---|---|---|
| $C_4$ | $-1.0876 \times 10^{-2}$ | $C_6$ | $1.8722 \times 10^{-2}$ | $C_8$ | $3.8132 \times 10^{-3}$ |
| $C_{10}$ | $-2.3015 \times 10^{-3}$ | $C_{11}$ | $-9.4351 \times 10^{-4}$ | $C_{13}$ | $7.1890 \times 10^{-4}$ |
| $C_{15}$ | $-2.0238 \times 10^{-4}$ | $C_{17}$ | $7.5766 \times 10^{-7}$ | $C_{19}$ | $6.5506 \times 10^{-6}$ |
| $C_{21}$ | $-2.2659 \times 10^{-6}$ | | | | |

FFS[2]

| | | | | | |
|---|---|---|---|---|---|
| $C_4$ | $-3.4639 \times 10^{-3}$ | $C_6$ | $8.1383 \times 10^{-3}$ | $C_8$ | $-1.9758 \times 10^{-4}$ |
| $C_{10}$ | $2.9221 \times 10^{-4}$ | $C_{11}$ | $-5.5124 \times 10^{-5}$ | $C_{13}$ | $1.5479 \times 10^{-4}$ |
| $C_{15}$ | $6.6936 \times 10^{-5}$ | $C_{17}$ | $-8.5001 \times 10^{-5}$ | $C_{19}$ | $2.5214 \times 10^{-5}$ |
| $C_{21}$ | $5.5366 \times 10^{-6}$ | | | | |

FFS[3]

| | | | | | |
|---|---|---|---|---|---|
| $C_4$ | $8.2999 \times 10^{-3}$ | $C_6$ | $-1.3417 \times 10^{-2}$ | $C_8$ | $-1.1302 \times 10^{-2}$ |
| $C_{10}$ | $3.6790 \times 10^{-3}$ | $C_{11}$ | $-6.3232 \times 10^{-3}$ | $C_{13}$ | $1.0246 \times 10^{-3}$ |
| $C_{15}$ | $-2.8677 \times 10^{-3}$ | $C_{17}$ | $-2.5809 \times 10^{-5}$ | $C_{19}$ | $7.5650 \times 10^{-5}$ |
| $C_{21}$ | $2.5953 \times 10^{-5}$ | | | | |

FFS[4]

| | | | | | |
|---|---|---|---|---|---|
| $C_4$ | $-1.1382 \times 10^{-2}$ | $C_6$ | $8.5352 \times 10^{-3}$ | $C_8$ | $-3.7586 \times 10^{-4}$ |
| $C_{10}$ | $-2.4037 \times 10^{-3}$ | $C_{11}$ | $-6.7309 \times 10^{-3}$ | $C_{13}$ | $1.8517 \times 10^{-4}$ |
| $C_{15}$ | $-2.4090 \times 10^{-3}$ | $C_{17}$ | $3.3122 \times 10^{-6}$ | $C_{19}$ | $-3.6259 \times 10^{-5}$ |
| $C_{21}$ | $6.6768 \times 10^{-6}$ | | | | |

FFS[5]

| | | | | | |
|---|---|---|---|---|---|
| $C_4$ | $1.5705 \times 10^{-2}$ | $C_6$ | $1.0829 \times 10^{-2}$ | $C_8$ | $1.2441 \times 10^{-3}$ |
| $C_{10}$ | $-1.2790 \times 10^{-4}$ | $C_{11}$ | $2.8097 \times 10^{-5}$ | $C_{13}$ | $1.7091 \times 10^{-4}$ |
| $C_{15}$ | $-5.2403 \times 10^{-5}$ | $C_{17}$ | $7.5880 \times 10^{-6}$ | $C_{19}$ | $-6.5573 \times 10^{-6}$ |
| $C_{21}$ | $-8.0334 \times 10^{-6}$ | | | | |

FFS[6]

| | | | | | |
|---|---|---|---|---|---|
| $C_4$ | $1.6748 \times 10^{-2}$ | $C_6$ | $1.7942 \times 10^{-2}$ | $C_8$ | $3.9750 \times 10^{-4}$ |
| $C_{10}$ | $-2.5862 \times 10^{-4}$ | $C_{11}$ | $5.0733 \times 10^{-5}$ | $C_{13}$ | $-1.4261 \times 10^{-4}$ |
| $C_{15}$ | $4.9657 \times 10^{-5}$ | $C_{17}$ | $1.0228 \times 10^{-6}$ | $C_{19}$ | $1.2043 \times 10^{-6}$ |
| $C_{21}$ | $-4.9047 \times 10^{-6}$ | | | | |

FFS[7]

| | | | | | |
|---|---|---|---|---|---|
| $C_4$ | $3.0031 \times 10^{-2}$ | $C_6$ | $4.1450 \times 10^{-2}$ | $C_8$ | $-9.0781 \times 10^{-3}$ |
| $C_{10}$ | $5.6794 \times 10^{-3}$ | $C_{11}$ | $-1.8767 \times 10^{-3}$ | $C_{13}$ | $-2.8469 \times 10^{-3}$ |
| $C_{15}$ | $2.0722 \times 10^{-4}$ | $C_{17}$ | $5.7808 \times 10^{-6}$ | $C_{19}$ | $-3.5047 \times 10^{-6}$ |
| $C_{21}$ | $-3.9132 \times 10^{-7}$ | | | | |

Displacement and tilt(1)

| X | 0.00 | Y | 0.00 | Z | 3.28 |
|---|---|---|---|---|---|
| α | −44.20 | β | 0.00 | γ | 0.00 |

Displacement and tilt(2)

| X | 0.00 | Y | 3.28 | Z | 3.19 |
|---|---|---|---|---|---|
| α | 103.12 | β | 0.00 | γ | 0.00 |

Displacement and tilt(3)

| X | 0.00 | Y | 3.80 | Z | 3.23 |
|---|---|---|---|---|---|
| α | 90.00 | β | 0.00 | γ | 0.00 |

Displacement and tilt(4)

| X | 0.00 | Y | 4.10 | Z | 3.25 |
|---|---|---|---|---|---|
| α | 97.44 | β | 0.00 | γ | 0.00 |

Displacement and tilt(5)

| X | 0.00 | Y | 11.38 | Z | 3.31 |
|---|---|---|---|---|---|
| α | −112.23 | β | 0.00 | γ | 0.00 |

Displacement and tilt(6)

| X | 0.00 | Y | 8.21 | Z | 0.25 |
|---|---|---|---|---|---|
| α | 20.54 | β | 0.00 | γ | 0.00 |

Displacement and tilt(7)

| X | 0.00 | Y | 7.75 | Z | 5.64 |
|---|---|---|---|---|---|
| α | −14.05 | β | 0.00 | γ | 0.00 |

Displacement and tilt(8)

| X | 0.00 | Y | 7.75 | Z | 6.61 |
|---|---|---|---|---|---|
| α | 0.00 | β | 0.00 | γ | 0.00 |

-continued

Displacement and tilt(9)

| X | 0.00 | Y | 7.75 | Z | 7.16 |
|---|---|---|---|---|---|
| α | 0.00 | β | 0.00 | γ | 0.00 |

Displacement and tilt(10)

| X | 0.00 | Y | 7.75 | Z | 7.86 |
|---|---|---|---|---|---|
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | FFS[1] | | | 1.5254 | 55.8 |
| 2 | FFS[2] (RE) | | (1) | 1.5254 | 55.8 |
| 3 | ∞ | | (2) | | |
| 4 | ∞ (Stop) | | (3) | | |
| 5 | ∞ | | (4) | 1.5254 | 55.8 |
| 6 | FFS[3] (RE) | | (5) | 1.5254 | 55.8 |
| 7 | FFS[4] (RE) | | (6) | 1.5254 | 55.8 |
| 8 | FFS[5] | | (7) | | |
| 9 | ∞ | | (8) | 1.5230 | 55.0 |
| 10 | ∞ | | (9) | | |
| Image plane | ∞ | | (10) | | |

FFS[1]

| | | | | | |
|---|---|---|---|---|---|
| $C_4$ | $-8.3188 \times 10^{-3}$ | $C_6$ | $3.4101 \times 10^{-2}$ | $C_8$ | $-1.4706 \times 10^{-3}$ |
| $C_{10}$ | $-1.1420 \times 10^{-3}$ | $C_{11}$ | $-6.5609 \times 10^{-5}$ | $C_{13}$ | $-1.7003 \times 10^{-4}$ |
| $C_{15}$ | $2.9132 \times 10^{-4}$ | $C_{17}$ | $9.7267 \times 10^{-5}$ | $C_{19}$ | $1.5357 \times 10^{-5}$ |
| $C_{21}$ | $-7.7116 \times 10^{-6}$ | | | | |

FFS[2]

| | | | | | |
|---|---|---|---|---|---|
| $C_4$ | $-6.7737 \times 10^{-4}$ | $C_6$ | $9.5729 \times 10^{-3}$ | $C_8$ | $-4.6635 \times 10^{-5}$ |
| $C_{10}$ | $3.2706 \times 10^{-4}$ | $C_{11}$ | $4.7807 \times 10^{-5}$ | $C_{13}$ | $-1.7131 \times 10^{-6}$ |
| $C_{15}$ | $5.7208 \times 10^{-5}$ | $C_{17}$ | $1.8852 \times 10^{-5}$ | $C_{19}$ | $-1.0239 \times 10^{-5}$ |
| $C_{21}$ | $5.2505 \times 10^{-6}$ | | | | |

FFS[3]

| | | | | | |
|---|---|---|---|---|---|
| $C_4$ | $1.8027 \times 10^{-2}$ | $C_6$ | $1.9843 \times 10^{-2}$ | $C_8$ | $2.7422 \times 10^{-4}$ |
| $C_{10}$ | $6.5409 \times 10^{-4}$ | $C_{11}$ | $-5.5779 \times 10^{-5}$ | $C_{13}$ | $7.9255 \times 10^{-6}$ |
| $C_{15}$ | $-1.3926 \times 10^{-5}$ | $C_{17}$ | $-1.0429 \times 10^{-5}$ | $C_{19}$ | $-2.8931 \times 10^{-5}$ |
| $C_{21}$ | $3.4435 \times 10^{-7}$ | | | | |

FFS[4]

| | | | | | |
|---|---|---|---|---|---|
| $C_4$ | $1.5424 \times 10^{-2}$ | $C_6$ | $1.1204 \times 10^{-2}$ | $C_8$ | $-1.0357 \times 10^{-4}$ |
| $C_{10}$ | $3.0996 \times 10^{-4}$ | $C_{11}$ | $5.5084 \times 10^{-5}$ | $C_{13}$ | $4.6769 \times 10^{-5}$ |
| $C_{15}$ | $2.6581 \times 10^{-5}$ | $C_{17}$ | $1.3231 \times 10^{-5}$ | $C_{19}$ | $-3.7769 \times 10^{-5}$ |
| $C_{21}$ | $-2.3725 \times 10^{-7}$ | | | | |

FFS[5]

| | | | | | |
|---|---|---|---|---|---|
| $C_4$ | $3.0719 \times 10^{-2}$ | $C_6$ | $-1.8684 \times 10^{-3}$ | $C_8$ | $-2.1354 \times 10^{-2}$ |
| $C_{10}$ | $1.9201 \times 10^{-3}$ | $C_{11}$ | $-2.9223 \times 10^{-3}$ | $C_{13}$ | $4.3539 \times 10^{-3}$ |
| $C_{15}$ | $2.0659 \times 10^{-3}$ | $C_{17}$ | $2.8765 \times 10^{-3}$ | $C_{19}$ | $-4.0186 \times 10^{-4}$ |
| $C_{21}$ | $2.7366 \times 10^{-4}$ | | | | |

Displacement and tilt(1)

| X | 0.00 | Y | 0.00 | Z | 3.81 |
|---|---|---|---|---|---|
| α | −41.81 | β | 0.00 | γ | 0.00 |

Displacement and tilt(2)

| X | 0.00 | Y | 3.26 | Z | 3.44 |
|---|---|---|---|---|---|
| α | 90.00 | β | 0.00 | γ | 0.00 |

Displacement and tilt(3)

| X | 0.00 | Y | 3.55 | Z | 3.39 |
|---|---|---|---|---|---|
| α | 90.00 | β | 0.00 | γ | 0.00 |

-continued

|  |  |  |  |  |  |  |  |
|---|---|---|---|---|---|---|---|
| Displacement and tilt(4) | | | | | | | |
| X | 0.00 | Y | 3.85 | Z | 3.34 | | |
| α | 90.00 | β | 0.00 | γ | 0.00 | | |
| Displacement and tilt(5) | | | | | | | |
| X | 0.00 | Y | 10.20 | Z | 2.63 | | |
| α | −103.66 | β | 0.00 | γ | 0.00 | | |
| Displacement and tilt(6) | | | | | | | |
| X | 0.00 | Y | 6.85 | Z | 0.39 | | |
| α | 28.25 | β | 0.00 | γ | 0.00 | | |
| Displacement and tilt(7) | | | | | | | |
| X | 0.00 | Y | 6.87 | Z | 5.55 | | |
| α | 0.59 | β | 0.00 | γ | 0.00 | | |
| Displacement and tilt(8) | | | | | | | |
| X | 0.00 | Y | 6.87 | Z | 5.87 | | |
| α | 0.00 | β | 0.00 | γ | 0.00 | | |
| Displacement and tilt(9) | | | | | | | |
| X | 0.00 | Y | 6.87 | Z | 6.42 | | |
| α | 0.00 | β | 0.00 | γ | 0.00 | | |
| Displacement and tilt(10) | | | | | | | |
| X | 0.00 | Y | 6.87 | Z | 7.12 | | |
| α | 0.00 | β | 0.00 | γ | 0.00 | | |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | FFS[1] | | | 1.5254 | 55.8 |
| 2 | FFS[2] | | (1) | | |
| 3 | FFS[3] | | (2) | 1.5254 | 55.8 |
| 4 | FFS[4] (RE) | | (3) | 1.5254 | 55.8 |
| 5 | FFS[5] | | (4) | | |
| 6 | FFS[6] | | (5) | 1.5254 | 55.8 |
| 7 | FFS[7] | | (6) | | |
| 8 | ∞ (Stop) | | (7) | | |
| 9 | FFS[8] | | (8) | 1.5254 | 55.8 |
| 10 | FFS[9] (RE) | | (9) | 1.5254 | 55.8 |
| 11 | FFS[10] (RE) | | (10) | 1.5254 | 55.8 |
| 12 | FFS[11] | | (11) | | |
| Image plane | ∞ | | (12) | | |

FFS[1]

$C_4$ 2.0000 × 10⁻² $C_6$ 2.0000 × 10⁻² $C_8$ 1.1946 × 10⁻²
$C_{10}$ −5.8807 × 10⁻⁴ $C_{11}$ −7.9166 × 10⁻⁴ $C_{13}$ −7.1566 × 10⁻⁴
$C_{15}$ −1.0835 × 10⁻⁴

FFS[2]

$C_4$ 1.0000 × 10⁻¹ $C_6$ 1.0000 × 10⁻¹ $C_8$ 6.8147 × 10⁻³
$C_{10}$ 4.9188 × 10⁻³ $C_{11}$ 4.4453 × 10⁻⁴ $C_{13}$ 1.4154 × 10⁻³
$C_{15}$ 3.3510 × 10⁻⁴

FFS[3]

$C_4$ 1.7171 × 10⁻² $C_6$ 7.6775 × 10⁻² $C_8$ 3.1854 × 10⁻³
$C_{10}$ 3.3543 × 10⁻³

FFS[4]

$C_4$ −3.9048 × 10⁻³ $C_6$ 1.0860 × 10⁻² $C_8$ −1.3280 × 10⁻⁴
$C_{10}$ 5.5067 × 10⁻⁴ $C_{11}$ −1.0727 × 10⁻⁴ $C_{13}$ −1.5579 × 10⁻⁴
$C_{15}$ 1.2262 × 10⁻⁶ $C_{17}$ 2.4134 × 10⁻⁶ $C_{19}$ 1.8572 × 10⁻⁶
$C_{21}$ 1.4336 × 10⁻⁷

-continued

FFS[5]

$C_4$ 5.6286 × 10⁻³ $C_6$ −6.0994 × 10⁻³ $C_8$ −1.8177 × 10⁻²
$C_{10}$ 6.0163 × 10⁻³

FFS[6]

$C_4$ 3.8725 × 10⁻² $C_6$ 5.1304 × 10⁻² $C_8$ 3.2587 × 10⁻³
$C_{10}$ −1.1068 × 10⁻³

FFS[7]

$C_4$ −4.2787 × 10⁻² $C_6$ −3.9264 × 10⁻² $C_8$ 3.3327 × 10⁻³
$C_{10}$ 2.4253 × 10⁻³

FFS[8]

$C_4$ −7.0676 × 10⁻² $C_6$ −3.3592 × 10⁻² $C_8$ −2.3000 × 10⁻²
$C_{10}$ 6.7004 × 10⁻³

FFS[9]

$C_4$ 1.7988 × 10⁻² $C_6$ 1.1739 × 10⁻² $C_8$ −5.7338 × 10⁻⁴
$C_{10}$ 2.9607 × 10⁻⁴ $C_{11}$ −1.5221 × 10⁻⁵ $C_{13}$ −2.0307 × 10⁻⁴
$C_{15}$ −1.2239 × 10⁻⁴ $C_{17}$ 3.6665 × 10⁻⁵ $C_{19}$ 2.0626 × 10⁻⁵
$C_{21}$ 7.9480 × 10⁻⁷

FFS[10]

$C_4$ 1.8873 × 10⁻² $C_6$ 1.6314 × 10⁻² $C_8$ 1.5726 × 10⁻⁵
$C_{10}$ −2.8459 × 10⁻⁴ $C_{11}$ −5.1367 × 10⁻⁶ $C_{13}$ 1.1099 × 10⁻⁴
$C_{15}$ 1.2208 × 10⁻⁴ $C_{17}$ 4.4417 × 10⁻⁵ $C_{19}$ 2.5091 × 10⁻⁵
$C_{21}$ 5.1441 × 10⁻⁸

FFS[11]

$C_4$ 9.2757 × 10⁻² $C_6$ 2.3495 × 10⁻² $C_8$ −1.3938 × 10⁻³
$C_{10}$ 2.7004 × 10⁻⁴

| Displacement and tilt(1) | | | | | | |
|---|---|---|---|---|---|---|
| X | 0.00 | Y | 0.00 | Z | 0.98 | |
| α | 0.00 | β | 0.00 | γ | 0.00 | |
| Displacement and tilt(2) | | | | | | |
| X | 0.00 | Y | 0.00 | Z | 1.98 | |
| α | 0.00 | β | 0.00 | γ | 0.00 | |
| Displacement and tilt(3) | | | | | | |
| X | 0.00 | Y | 0.00 | Z | 5.59 | |
| α | −44.06 | β | 0.00 | γ | 0.00 | |
| Displacement and tilt(4) | | | | | | |
| X | 0.00 | Y | 3.49 | X | 5.47 | |
| α | 93.16 | β | 0.00 | γ | 0.00 | |
| Displacement and tilt(5) | | | | | | |
| X | 0.00 | Y | 3.79 | Z | 5.46 | |
| α | 91.13 | β | 0.00 | γ | 0.00 | |
| Displacement and tilt(6) | | | | | | |
| X | 0.00 | Y | 5.48 | Z | 5.43 | |
| α | 100.57 | β | 0.00 | γ | 0.00 | |
| Displacement and tilt(7) | | | | | | |
| X | 0.00 | Y | 7.48 | Z | 5.56 | |
| α | 90.00 | β | 0.00 | γ | 0.00 | |
| Displacement and tilt(8) | | | | | | |
| X | 0.00 | Y | 8.44 | Z | 5.63 | |
| α | 101.09 | β | 0.00 | γ | 0.00 | |
| Displacement and tilt(9) | | | | | | |
| X | 0.00 | Y | 14.72 | Z | 5.48 | |
| α | −111.38 | β | 0.00 | γ | 0.00 | |
| Displacement and tilt(10) | | | | | | |
| X | 0.00 | Y | 11.74 | Z | 2.58 | |
| α | 20.62 | β | 0.00 | γ | 0.00 | |
| Displacement and tilt(11) | | | | | | |
| X | 0.00 | Y | 11.32 | Z | 7.77 | |
| α | −13.27 | β | 0.00 | γ | 0.00 | |

-continued

| | Displacement and tilt(12) | | | | |
|---|---|---|---|---|---|
| X | 0.00 | Y | 11.32 | Z | 9.26 |
| α | 0.00 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | FFS[1] | | | 1.5254 | 55.8 |
| 2 | FFS[2] | | (1) | | |
| 3 | FFS[3] | | (2) | 1.5254 | 55.8 |
| 4 | FFS[4] (RE) | | (3) | 1.5254 | 55.8 |
| 5 | FFS[5] | | (4) | | |
| 6 | ∞ (Stop) | | (5) | | |
| 7 | 26.42 | | (6) | 1.4875 | 70.2 |
| 8 | −25.56 | | (7) | 1.8467 | 23.8 |
| 9 | 91.83 | | (8) | | |
| 10 | FFS[6] | | (9) | 1.5254 | 55.8 |
| 11 | FFS[7] (RE) | | (10) | 1.5254 | 55.8 |
| 12 | FFS[8] (RE) | | (11) | 1.5254 | 55.8 |
| 13 | FFS[9] | | (12) | | |
| Image plane | ∞ | | (13) | | |

FFS[1]

| $C_4$ | $2.0000 \times 10^{-2}$ | $C_6$ | $2.0000 \times 10^{-2}$ | | |
|---|---|---|---|---|---|

FFS[2]

| $C_4$ | $5.0000 \times 10^{-2}$ | $C_6$ | $5.0000 \times 10^{-2}$ | | |

FFS[3]

| $C_4$ | $1.2590 \times 10^{-2}$ | $C_6$ | $2.2298 \times 10^{-2}$ | $C_8$ | $-1.4601 \times 10^{-3}$ |
| $C_{10}$ | $-2.2701 \times 10^{-3}$ | | | | |

FFS[4]

| $C_4$ | $1.2623 \times 10^{-3}$ | $C_6$ | $7.4927 \times 10^{-3}$ | $C_8$ | $-3.5490 \times 10^{-4}$ |
| $C_{10}$ | $6.6809 \times 10^{-5}$ | | | | |

FFS[5]

| $C_4$ | $-1.2986 \times 10^{-3}$ | $C_6$ | $-2.1570 \times 10^{-2}$ | $C_8$ | $-7.7391 \times 10^{-4}$ |
| $C_{10}$ | $1.8483 \times 10^{-3}$ | | | | |

FFS[6]

| $C_4$ | $-5.7722 \times 10^{-3}$ | $C_6$ | $1.4384 \times 10^{-2}$ | | |

FFS[7]

| $C_4$ | $1.2923 \times 10^{-2}$ | $C_6$ | $1.0533 \times 10^{-2}$ | $C_8$ | $2.2071 \times 10^{-4}$ |
| $C_{10}$ | $2.7636 \times 10^{-4}$ | | | | |

FFS[8]

| $C_4$ | $2.0834 \times 10^{-2}$ | $C_6$ | $1.6339 \times 10^{-2}$ | $C_8$ | $-2.1295 \times 10^{-4}$ |
| $C_{10}$ | $-5.5350 \times 10^{-5}$ | | | | |

FFS[9]

| $C_4$ | $9.0843 \times 10^{-3}$ | $C_6$ | $3.1887 \times 10^{-2}$ | | |

Displacement and tilt(1)

| X | 0.00 | Y | 0.00 | Z | 0.98 |
| α | 0.00 | β | 0.00 | γ | 0.00 |

Displacement and tilt(2)

| X | 0.00 | Y | 0.00 | Z | 2.79 |
| α | 0.00 | β | 0.00 | γ | 0.00 |

Displacement and tilt(3)

| X | 0.00 | Y | 0.00 | Z | 6.30 |
| α | −39.68 | β | 0.00 | γ | 0.00 |

Displacement and tilt(4)

| X | 0.00 | Y | 3.43 | Z | 5.66 |
| α | 108.31 | β | 0.00 | γ | 0.00 |

Displacement and tilt(5)

| X | 0.00 | Y | 4.24 | Z | 5.56 |
| α | 90.00 | β | 0.00 | γ | 0.00 |

Displacement and tilt(6)

| X | 0.00 | Y | 4.59 | Z | 5.52 |
| α | 85.88 | β | 0.00 | γ | 0.00 |

Displacement and tilt(7)

| X | 0.00 | Y | 6.19 | Z | 5.44 |
| α | 89.00 | β | 0.00 | γ | 0.00 |

Displacement and tilt(8)

| X | 0.00 | Y | 6.79 | Z | 5.42 |
| α | 84.87 | β | 0.00 | γ | 0.00 |

Displacement and tilt(9)

| X | 0.00 | Y | 7.11 | Z | 5.37 |
| α | 87.92 | β | 0.00 | γ | 0.00 |

Displacement and tilt(10)

| X | 0.00 | Y | 14.23 | Z | 4.76 |
| α | −109.61 | β | 0.00 | γ | 0.00 |

Displacement and tilt(11)

| X | 0.00 | Y | 10.91 | Z | 1.54 |
| α | 21.91 | β | 0.00 | γ | 0.00 |

Displacement and tilt(12)

| X | 0.00 | Y | 10.65 | Z | 8.65 |
| α | −5.96 | β | 0.00 | γ | 0.00 |

Displacement and tilt(13)

| X | 0.00 | Y | 10.65 | Z | 9.93 |
| α | 0.00 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | ∞ | | | |
| 1 | FFS [1] | | | 1.5254 | 55.8 |
| 2 | FFS [2] (RE) | | (1) | 1.5254 | 55.8 |
| 3 | FFS [3] | | (2) | | |
| 4 | ∞ (Stop) | | (3) | | |
| 5 | FFS [4] | | (4) | 1.5254 | 55.8 |
| 6 | FFS [5] (RE) | | (5) | 1.5254 | 55.8 |
| 7 | FFS [6] (RE) | | (6) | 1.5254 | 55.8 |
| 8 | FFS [7] | | (7) | | |
| 9 | ∞ | | (8) | 1.5230 | 55.0 |
| 10 | ∞ | | (9) | | |
| Image plane | ∞ | | (10) | | |

FFS [1]

| $C_4$ | $6.3181 \times 10^{-2}$ | $C_6$ | $5.5570 \times 10^{-2}$ | $C_8$ | $-3.3844 \times 10^{-3}$ |
| $C_{10}$ | $-5.7782 \times 10^{-3}$ | $C_{11}$ | $1.7725 \times 10^{-4}$ | $C_{13}$ | $1.8532 \times 10^{-3}$ |
| $C_{15}$ | $-6.6338 \times 10^{-4}$ | | | | |

FFS [2]

| $C_4$ | $-3.3697 \times 10^{-3}$ | $C_6$ | $2.5129 \times 10^{-2}$ | $C_8$ | $-2.9824 \times 10^{-3}$ |
| $C_{10}$ | $8.9613 \times 10^{-4}$ | $C_{11}$ | $-4.8268 \times 10^{-5}$ | $C_{13}$ | $-4.5960 \times 10^{-4}$ |
| $C_{15}$ | $-1.0989 \times 10^{-4}$ | | | | |

FFS [3]

| $C_4$ | $1.7210 \times 10^{-1}$ | $C_6$ | $-5.8597 \times 10^{-2}$ | $C_8$ | $-3.1486 \times 10^{-2}$ |

-continued

| | | | | | | |
|---|---|---|---|---|---|---|
| $C_{10}$ | $8.7575 \times 10^{-3}$ | $C_{11}$ | $7.2450 \times 10^{-3}$ | $C_{13}$ | $1.2987 \times 10^{-2}$ | |
| $C_{15}$ | $3.3349 \times 10^{-4}$ | | | | | |

FFS [4]

| | | | | | |
|---|---|---|---|---|---|
| $C_4$ | $-1.2528 \times 10^{-1}$ | $C_6$ | $7.4983 \times 10^{-4}$ | $C_8$ | $1.8953 \times 10^{-2}$ |
| $C_{10}$ | $-4.1145 \times 10^{-3}$ | | | | |

FFS [5]

| | | | | | |
|---|---|---|---|---|---|
| $C_4$ | $3.1742 \times 10^{-2}$ | $C_6$ | $1.3764 \times 10^{-2}$ | $C_8$ | $4.0065 \times 10^{-3}$ |
| $C_{10}$ | $7.9962 \times 10^{-5}$ | $C_{11}$ | $-1.1218 \times 10^{-5}$ | $C_{13}$ | $4.4854 \times 10^{-4}$ |
| $C_{15}$ | $-5.4494 \times 10^{-5}$ | | | | |

FFS [6]

| | | | | | |
|---|---|---|---|---|---|
| $C_4$ | $2.8074 \times 10^{-2}$ | $C_6$ | $2.2930 \times 10^{-2}$ | $C_8$ | $8.0791 \times 10^{-4}$ |
| $C_{10}$ | $-7.3036 \times 10^{-5}$ | $C_{11}$ | $9.2368 \times 10^{-5}$ | $C_{13}$ | $-1.5571 \times 10^{-4}$ |
| $C_{15}$ | $4.2179 \times 10^{-5}$ | | | | |

FFS [7]

| | | | | | |
|---|---|---|---|---|---|
| $C_4$ | $6.9062 \times 10^{-2}$ | $C_6$ | $6.1563 \times 10^{-2}$ | $C_8$ | $-2.7267 \times 10^{-2}$ |
| $C_{10}$ | $5.4367 \times 10^{-3}$ | | | | |

Displacement and tilt (1)

| X | 0.00 | Y | 0.00 | Z | 2.95 |
|---|---|---|---|---|---|
| α | −41.53 | β | 0.00 | γ | 0.00 |

Displacement and tilt (2)

| X | 0.00 | Y | 3.25 | Z | 2.55 |
|---|---|---|---|---|---|
| α | 106.12 | β | 0.00 | γ | 0.00 |

Displacement and tilt (3)

| X | 0.00 | Y | 3.77 | Z | 2.54 |
|---|---|---|---|---|---|
| α | 89.24 | β | 0.00 | γ | 0.00 |

Displacement and tilt (4)

| X | 0.00 | Y | 4.07 | Z | 2.52 |
|---|---|---|---|---|---|
| α | 103.24 | β | 0.00 | γ | 0.00 |

Displacement and tilt (5)

| X | 0.00 | Y | 9.29 | Z | 1.98 |
|---|---|---|---|---|---|
| α | −106.73 | β | 0.00 | γ | 0.00 |

Displacement and tilt (6)

| X | 0.00 | Y | 6.80 | Z | −0.06 |
|---|---|---|---|---|---|
| α | 23.77 | β | 0.00 | γ | 0.00 |

Displacement and tilt (7)

| X | 0.00 | Y | 6.57 | Z | 4.12 |
|---|---|---|---|---|---|
| α | −8.88 | β | 0.00 | γ | 0.00 |

Displacement and tilt (8)

| X | 0.00 | Y | 6.57 | Z | 5.09 |
|---|---|---|---|---|---|
| α | 0.00 | β | 0.00 | γ | 0.00 |

Displacement and tilt (9)

| X | 0.00 | Y | 6.57 | Z | 5.64 |
|---|---|---|---|---|---|
| α | 0.00 | β | 0.00 | γ | 0.00 |

Displacement and tilt (10)

| X | 0.00 | Y | 6.57 | Z | 6.34 |
|---|---|---|---|---|---|
| α | 0.00 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | ∞ | | | |
| 1 | 24.10 | | | 1.5254 | 55.8 |
| 2 | 8.92 | | (1) | | |
| 3 | FFS [1] | | (2) | 1.5254 | 55.8 |
| 4 | FFS [2] (RE) | | (3) | 1.5254 | 55.8 |
| 5 | FFS [3] | | (4) | | |
| 6 | ∞ (Stop) | | (5) | | |
| 7 | FFS [4] | | (6) | 1.5254 | 55.8 |
| 8 | FFS [5] (RE) | | (7) | 1.5254 | 55.8 |
| 9 | FFS [6] (RE) | | (8) | 1.5254 | 55.8 |
| 10 | FFS [7] | | (9) | | |
| Image plane | ∞ | | (10) | | |

FFS [1]

| | | | | | |
|---|---|---|---|---|---|
| $C_4$ | $-4.8714 \times 10^{-2}$ | $C_6$ | $8.4040 \times 10^{-2}$ | $C_8$ | $-1.7945 \times 10^{-3}$ |
| $C_{10}$ | $-2.5019 \times 10^{-3}$ | $C_{11}$ | $2.0601 \times 10^{-5}$ | $C_{13}$ | $-7.1856 \times 10^{-4}$ |
| $C_{15}$ | $1.8130 \times 10^{-4}$ | | | | |

FFS [2]

| | | | | | |
|---|---|---|---|---|---|
| $C_4$ | $-4.2753 \times 10^{-3}$ | $C_6$ | $1.9133 \times 10^{-2}$ | $C_8$ | $-2.4842 \times 10^{-3}$ |
| $C_{10}$ | $1.1740 \times 10^{-3}$ | $C_{11}$ | $2.7754 \times 10^{-4}$ | $C_{13}$ | $-1.9087 \times 10^{-4}$ |
| $C_{15}$ | $-9.4700 \times 10^{-6}$ | | | | |

FFS [3]

| | | | | | |
|---|---|---|---|---|---|
| $C_4$ | $6.9069 \times 10^{-4}$ | $C_6$ | $8.4968 \times 10^{-3}$ | $C_8$ | $-3.4825 \times 10^{-2}$ |
| $C_{10}$ | $3.0785 \times 10^{-3}$ | $C_{11}$ | $6.0410 \times 10^{-4}$ | $C_{13}$ | $4.0374 \times 10^{-3}$ |
| $C_{15}$ | $4.4752 \times 10^{-4}$ | | | | |

FFS [4]

| | | | | | |
|---|---|---|---|---|---|
| $C_4$ | $-1.3766 \times 10^{-2}$ | $C_6$ | $1.7379 \times 10^{-2}$ | $C_8$ | $-2.2103 \times 10^{-2}$ |
| $C_{10}$ | $-8.8392 \times 10^{-3}$ | $C_{11}$ | $8.8139 \times 10^{-4}$ | $C_{13}$ | $1.8399 \times 10^{-4}$ |
| $C_{15}$ | $-7.1512 \times 10^{-4}$ | | | | |

FFS [5]

| | | | | | |
|---|---|---|---|---|---|
| $C_4$ | $2.1590 \times 10^{-2}$ | $C_6$ | $1.3277 \times 10^{-2}$ | $C_8$ | $3.9835 \times 10^{-5}$ |
| $C_{10}$ | $-2.2243 \times 10^{-4}$ | $C_{11}$ | $-8.5016 \times 10^{-5}$ | $C_{13}$ | $9.8488 \times 10^{-5}$ |
| $C_{15}$ | $-7.2585 \times 10^{-5}$ | | | | |

FFS [6]

| | | | | | |
|---|---|---|---|---|---|
| $C_4$ | $2.0467 \times 10^{-2}$ | $C_6$ | $2.3538 \times 10^{-2}$ | $C_8$ | $-4.9160 \times 10^{-4}$ |
| $C_{10}$ | $-6.5792 \times 10^{-4}$ | $C_{11}$ | $1.2545 \times 10^{-4}$ | $C_{13}$ | $-4.8500 \times 10^{-5}$ |
| $C_{15}$ | $8.1542 \times 10^{-5}$ | | | | |

FFS [7]

| | | | | | |
|---|---|---|---|---|---|
| $C_4$ | $1.2807 \times 10^{-1}$ | $C_6$ | $1.8328 \times 10^{-3}$ | $C_8$ | $8.2578 \times 10^{-4}$ |
| $C_{10}$ | $-8.0129 \times 10^{-3}$ | $C_{11}$ | $-1.4845 \times 10^{-3}$ | $C_{13}$ | $2.2055 \times 10^{-3}$ |
| $C_{15}$ | $2.3496 \times 10^{-3}$ | | | | |

Displacement and tilt (1)

| X | 0.00 | Y | 0.00 | Z | 0.50 |
|---|---|---|---|---|---|
| α | 0.00 | β | 0.00 | γ | 0.00 |

Displacement and tilt (2)

| X | 0.00 | Y | 0.00 | Z | 1.00 |
|---|---|---|---|---|---|
| α | 0.00 | β | 0.00 | γ | 0.00 |

Displacement and tilt (3)

| X | 0.00 | Y | 0.00 | Z | 3.95 |
|---|---|---|---|---|---|
| α | −43.39 | β | 0.00 | γ | 0.00 |

Displacement and tilt (4)

| X | 0.00 | Y | 3.60 | Z | 3.75 |
|---|---|---|---|---|---|
| α | 100.93 | β | 0.00 | γ | 0.00 |

Displacement and tilt (5)

| X | 0.00 | Y | 4.39 | Z | 3.76 |
|---|---|---|---|---|---|
| α | 90.00 | β | 0.00 | γ | 0.00 |

Displacement and tilt (6)

| X | 0.00 | Y | 4.69 | Z | 3.76 |
|---|---|---|---|---|---|
| α | 97.97 | β | 0.00 | γ | 0.00 |

Displacement and tilt (7)

| X | 0.00 | Y | 11.81 | Z | 3.49 |
|---|---|---|---|---|---|
| α | −110.44 | β | 0.00 | γ | 0.00 |

Displacement and tilt (8)

| X | 0.00 | Y | 8.61 | Z | 0.51 |
|---|---|---|---|---|---|
| α | 22.80 | β | 0.00 | γ | 0.00 |

Displacement and tilt (9)

| X | 0.00 | Y | 8.48 | Z | 6.28 |
|---|---|---|---|---|---|

-continued

| α | −3.87 | β | 0.00 | γ | 0.00 |
|---|---|---|---|---|---|
| | | Displacement and tilt (10) | | | |
| X | 0.00 | Y | 8.48 | Z | 7.53 |
| α | 0.00 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | ∞ | | | |
| 1 | FFS [1] | | | 1.5163 | 64.1 |
| 2 | FFS [2] | | (1) | | |
| 3 | FFS [3] (RE) | | (2) | | |
| 4 | (Stop) | | (3) | | |
| 5 | FFS [4] (RE) | | (4) | | |
| 6 | FFS [5] (RE) | | (5) | | |
| Image plane | ∞ | | (6) | | |

FFS [1]

| $C_4$ | $-2.7232 \times 10^{-2}$ | $C_6$ | $-9.0100 \times 10^{-3}$ | $C_{11}$ | $-7.5054 \times 10^{-4}$ |
|---|---|---|---|---|---|
| $C_{13}$ | $2.1618 \times 10^{-3}$ | $C_{15}$ | $1.4549 \times 10^{-5}$ | | |

FFS [2]

| $C_4$ | $9.4468 \times 10^{-3}$ | $C_6$ | $-2.8157 \times 10^{-3}$ | $C_{11}$ | $-8.9741 \times 10^{-4}$ |
|---|---|---|---|---|---|
| $C_{10}$ | $1.9448 \times 10^{-3}$ | $C_{15}$ | $-3.3780 \times 10^{-4}$ | | |

FFS [3]

| $C_4$ | $1.9919 \times 10^{-3}$ | $C_6$ | $1.2928 \times 10^{-2}$ | $C_8$ | $1.5372 \times 10^{-3}$ |
|---|---|---|---|---|---|
| $C_{10}$ | $1.0348 \times 10^{-3}$ | $C_{11}$ | $1.0484 \times 10^{-4}$ | $C_{13}$ | $1.4866 \times 10^{-4}$ |
| $C_{15}$ | $1.9176 \times 10^{-4}$ | $C_{17}$ | $-1.7543 \times 10^{-4}$ | $C_{19}$ | $-3.2877 \times 10^{-5}$ |
| $C_{21}$ | $2.0962 \times 10^{-5}$ | | | | |

FFS [4]

| $C_4$ | $2.1674 \times 10^{-2}$ | $C_6$ | $2.0348 \times 10^{-2}$ | $C_8$ | $1.1708 \times 10^{-3}$ |
|---|---|---|---|---|---|
| $C_{10}$ | $1.0584 \times 10^{-3}$ | $C_{11}$ | $-9.7033 \times 10^{-5}$ | $C_{13}$ | $1.7073 \times 10^{-5}$ |
| $C_{15}$ | $-8.8757 \times 10^{-5}$ | $C_{17}$ | $-8.4597 \times 10^{-5}$ | $C_{19}$ | $-1.0497 \times 10^{-4}$ |
| $C_{21}$ | $1.0517 \times 10^{-5}$ | | | | |

FFS [5]

| $C_4$ | $2.4519 \times 10^{-2}$ | $C_6$ | $2.0736 \times 10^{-2}$ | $C_8$ | $1.1245 \times 10^{-3}$ |
|---|---|---|---|---|---|
| $C_{10}$ | $5.6883 \times 10^{-4}$ | $C_{11}$ | $1.9501 \times 10^{-4}$ | $C_{13}$ | $-6.5199 \times 10^{-5}$ |
| $C_{15}$ | $6.9428 \times 10^{-5}$ | $C_{17}$ | $-1.0562 \times 10^{-4}$ | $C_{19}$ | $-1.1938 \times 10^{-4}$ |
| $C_{21}$ | $8.1141 \times 10^{-6}$ | | | | |

Displacement and tilt (1)

| X | 0.00 | Y | 0.00 | Z | 1.53 |
|---|---|---|---|---|---|
| α | −0.90 | β | 0.00 | γ | 0.00 |

Displacement and tilt (2)

| X | 0.00 | Y | 0.02 | Z | 4.40 |
|---|---|---|---|---|---|
| α | −39.83 | β | 0.00 | γ | 0.00 |

Displacement and tilt (3)

| X | 0.00 | Y | 4.95 | Z | 3.54 |
|---|---|---|---|---|---|
| α | 90.00 | β | 0.00 | γ | 0.00 |

Displacement and tilt (4)

| X | 0.00 | Y | 11.79 | Z | 2.35 |
|---|---|---|---|---|---|
| α | −104.17 | β | 0.00 | γ | 0.00 |

Displacement and tilt (5)

| X | 0.00 | Y | 8.47 | Z | −0.26 |
|---|---|---|---|---|---|
| α | 25.90 | β | 0.00 | γ | 0.00 |

Displacement and tilt (6)

| X | 0.00 | Y | 8.47 | Z | 6.22 |
|---|---|---|---|---|---|
| α | 0.00 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | ∞ | | | |
| 1 | FFS [1] | | | 1.5163 | 64.1 |
| 2 | FFS [2] | | (1) | | |
| 3 | FFS [3] (RE) | | (2) | | |
| 4 | ∞ (Stop) | | (3) | | |
| 5 | FFS [4] (RE) | | (4) | | |
| 6 | FFS [5] (RF) | | (5) | | |
| Image plane | ∞ | | (6) | | |

FFS [1]

| $C_4$ | $-2.7232 \times 10^{-2}$ | $C_6$ | $-9.0100 \times 10^{-3}$ | $C_{11}$ | $-7.5054 \times 10^{-4}$ |
|---|---|---|---|---|---|
| $C_{13}$ | $2.1618 \times 10^{-3}$ | $C_{15}$ | $1.4549 \times 10^{-5}$ | | |

FFS [2]

| $C_4$ | $9.4468 \times 10^{-3}$ | $C_6$ | $-2.8157 \times 10^{-3}$ | $C_{11}$ | $-8.9741 \times 10^{-4}$ |
|---|---|---|---|---|---|
| $C_{13}$ | $1.9448 \times 10^{-3}$ | $C_{15}$ | $-3.3780 \times 10^{-4}$ | | |

FFS [3]

| $C_4$ | $1.0483 \times 10^{-2}$ | $C_6$ | $-5.4008 \times 10^{-4}$ | $C_8$ | $-6.4000 \times 10^{-4}$ |
|---|---|---|---|---|---|
| $C_{10}$ | $-9.2325 \times 10^{-5}$ | $C_{11}$ | $-6.8142 \times 10^{-5}$ | $C_{13}$ | $3.1459 \times 10^{-4}$ |
| $C_{15}$ | $9.0778 \times 10^{-5}$ | $C_{17}$ | $1.4915 \times 10^{-4}$ | $C_{19}$ | $1.4624 \times 10^{-4}$ |
| $C_{21}$ | $9.0719 \times 10^{-6}$ | | | | |

FFS [4]

| $C_4$ | $2.1691 \times 10^{-2}$ | $C_6$ | $1.3825 \times 10^{-2}$ | $C_8$ | $-2.0053 \times 10^{-3}$ |
|---|---|---|---|---|---|
| $C_{10}$ | $-5.6071 \times 10^{-4}$ | $C_{11}$ | $1.2464 \times 10^{-4}$ | $C_{13}$ | $6.5649 \times 10^{-5}$ |
| $C_{15}$ | $1.2384 \times 10^{-4}$ | $C_{17}$ | $1.9740 \times 10^{-4}$ | $C_{19}$ | $3.4085 \times 10^{-4}$ |
| $C_{21}$ | $-2.0413 \times 10^{-5}$ | | | | |

FFS [5]

| $C_4$ | $1.1252 \times 10^{-2}$ | $C_6$ | $1.7687 \times 10^{-2}$ | $C_8$ | $-4.0478 \times 10^{-3}$ |
|---|---|---|---|---|---|
| $C_{10}$ | $-1.4871 \times 10^{-3}$ | $C_{11}$ | $-1.9722 \times 10^{-4}$ | $C_{13}$ | $1.2636 \times 10^{-5}$ |
| $C_{15}$ | $-9.7565 \times 10^{-5}$ | $C_{17}$ | $3.0055 \times 10^{-4}$ | $C_{19}$ | $3.9212 \times 10^{-4}$ |
| $C_{21}$ | $-3.3346 \times 10^{-5}$ | | | | |

Displacement and tilt (1)

| X | 0.00 | Y | 0.00 | Z | 1.53 |
|---|---|---|---|---|---|
| α | −0.90 | β | 0.00 | γ | 0.00 |

Displacement and tilt (2)

| X | 0.00 | Y | 0.02 | Z | 4.40 |
|---|---|---|---|---|---|
| α | −39.83 | β | 0.00 | γ | 0.00 |

Displacement and tilt (3)

| X | 0.00 | Y | 4.95 | Z | 3.54 |
|---|---|---|---|---|---|
| α | 90.00 | β | 0.00 | γ | 0.00 |

Displacement and tilt (4)

| X | 0.00 | Y | 11.79 | Z | 2.35 |
|---|---|---|---|---|---|
| α | −104.17 | β | 0.00 | γ | 0.00 |

Displacement and tilt (5)

| X | 0.00 | Y | 8.47 | Z | −0.26 |
|---|---|---|---|---|---|
| α | 25.90 | β | 0.00 | γ | 0.00 |

Displacement and tilt (6)

| X | 0.00 | Y | 8.47 | Z | 6.22 |
|---|---|---|---|---|---|
| α | 0.00 | β | 0.00 | γ | 0.00 |

Figure 9:
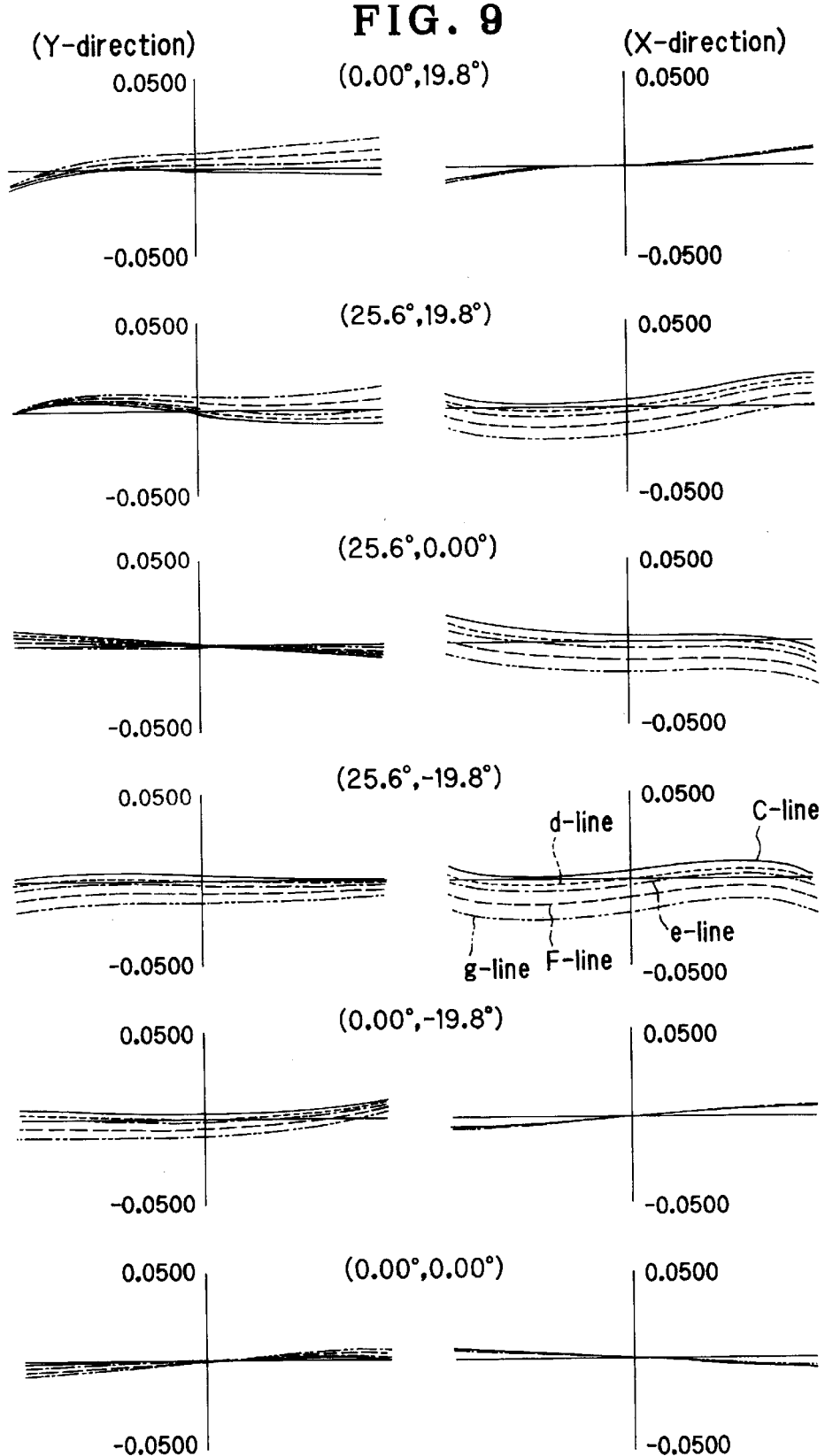
FIG. 9 is an aberrational diagram showing lateral aberrations in the image-forming optical system according to Example 1.
Figure 10:
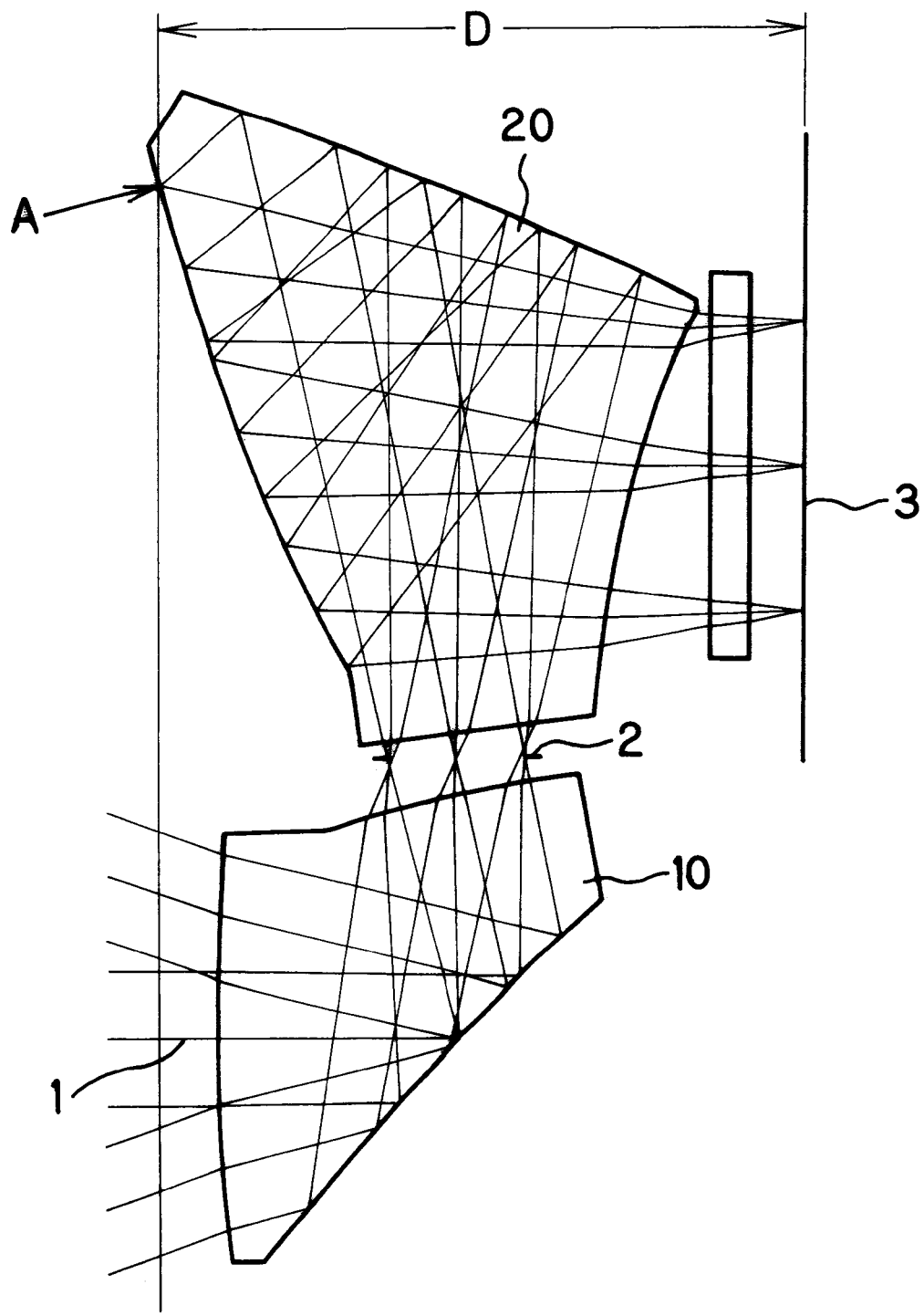
FIG. 10 is a diagram for describing the definition of the thickness D of an optical system.

FIG. 9 is an aberrational diagram showing lateral aberrations in the above-described Example 1. In the diagram showing lateral aberrations, the numerals in the parentheses denote (horizontal (X-direction) field angle, vertical (Y-direction) field angle), and lateral aberrations at the field angles are shown.

The values of the conditions (1-1) to (9-1) in the above-described Examples 1 to 8 are as follows:

| Conditions | Examples | | | | | | | |
|---|---|---|---|---|---|---|---|---|
| | 1 | 2 | 3 | 4 | 5 | 6 | 7 | 8 |
| (1-1) | −0.03 | −0.03 | 0.37 | −0.11 | −0.23 | −0.26 | −0.22 | −0.01 |
| (2-1) | −0.19 | −0.20 | 0.22 | −0.21 | −0.22 | −0.37 | −0.33 | −0.03 |
| (3-1) | 0.99 | 0.94 | 0.70 | 0.83 | 1.35 | 0.79 | 0.68 | 0.87 |
| (4-1) | 0.97 | 0.88 | 0.82 | 0.78 | 0.89 | 0.70 | 0.61 | 0.94 |
| (5-1) | 88.4 | 83.6 | 88.1 | 79.4 | 83.1 | 86.8 | 80.1 | 80.1 |
| (6-1) | 1.38 | 1.39 | 1.70 | 1.93 | 1.62 | 2.20 | 1.72 | 0.92 |
| (7-1) | 0.61 | 0.61 | 1.37 | 0.83 | 0.84 | 1.19 | 0.63 | 0.35 |
| (8-1) | 1.13 | 1.26 | 2.39 | 2.06 | 1.49 | 2.26 | 2.06 | 1.16 |
| (9-1) | 2.78 | 2.71 | 3.04 | 4.23 | 2.87 | 4.76 | 3.86 | 2.18 |

Incidentally, the above-described image-forming optical system according to the present invention can be used in photographic apparatus, particularly in cameras, in which an object image formed by the image-forming optical system is received with an image pickup device, such as a CCD or a silver halide film, to take a photograph of the object. It is also possible to use the image-forming optical system as an objective optical system of an observation apparatus in which an object image is viewed through an ocular lens, particularly a finder unit of a camera. The image-forming optical system according to the present invention is also usable as an image pickup optical system for optical apparatus using a small-sized image pickup device, e.g. endoscopes. Embodiments in which the present invention is applied to such apparatuses will be described below.

Figure 11:
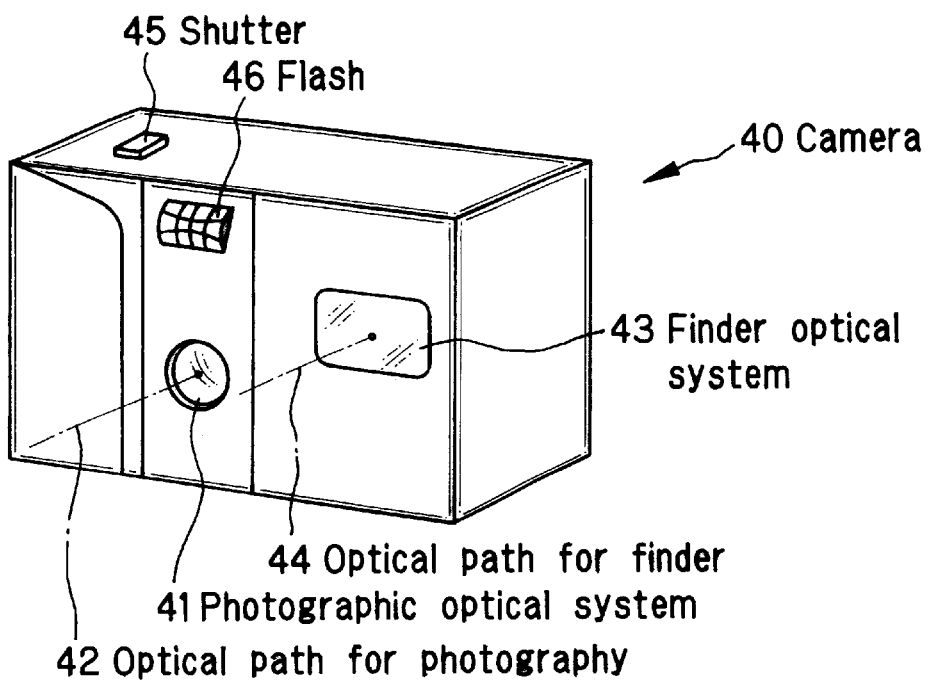
FIG. 11 is a perspective view showing the external appearance of an electronic camera to which an image-forming optical system according to the present invention is applied, as viewed from the front side thereof.
Figure 12:
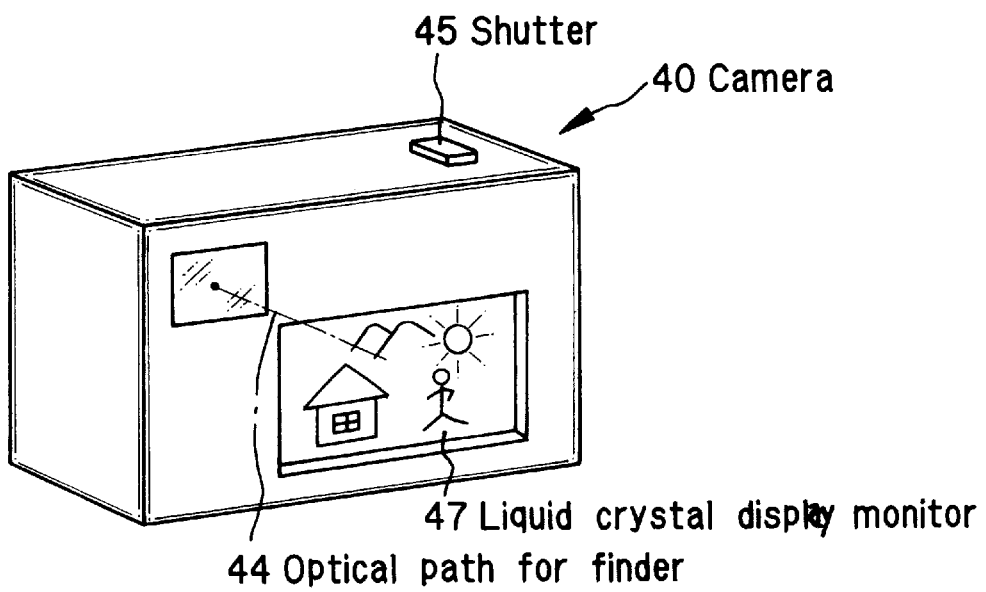
FIG. 12 is a perspective view of the electronic camera shown in FIG. 11, as viewed from the rear side thereof.
Figure 13:
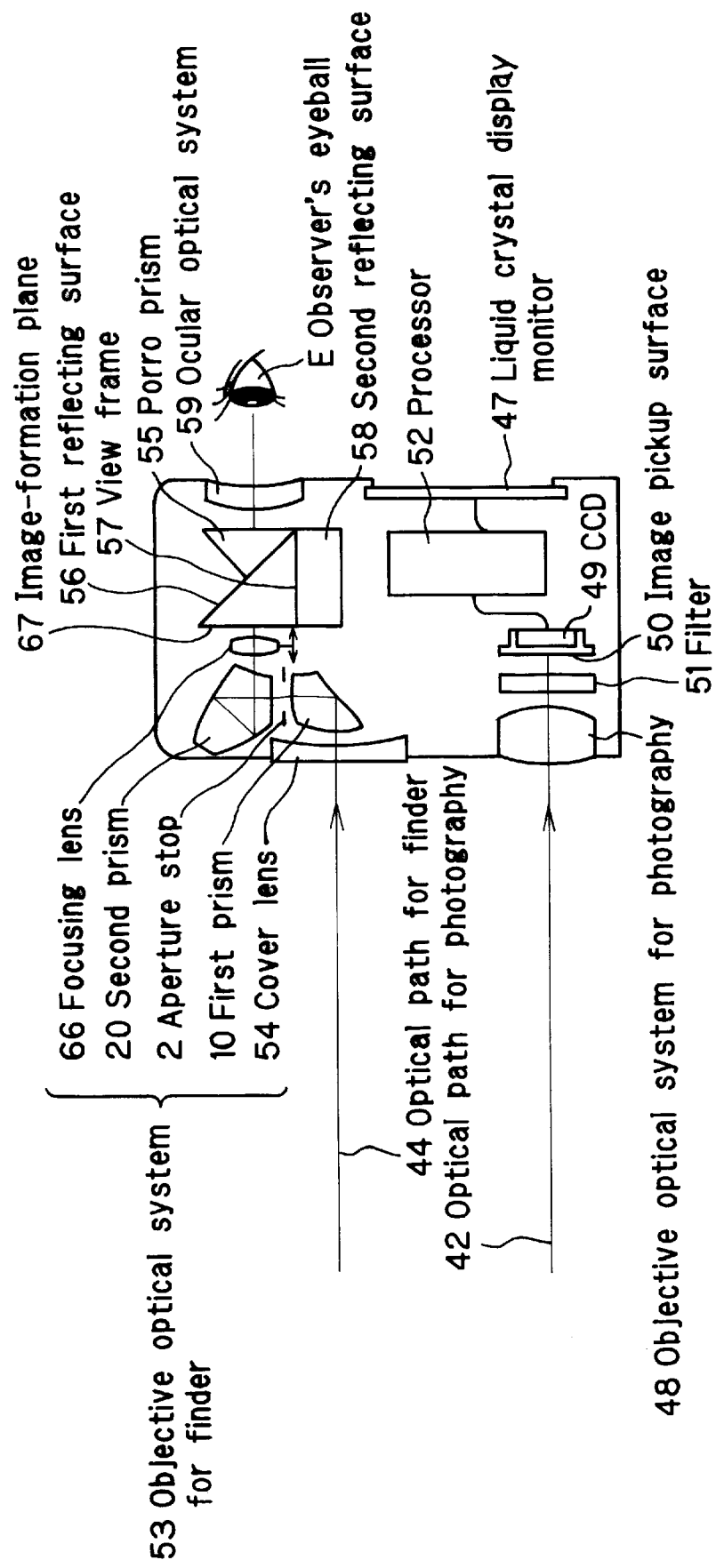
FIG. 13 is a sectional view showing the arrangement of the electronic camera in FIG. 11.

FIGS. 11 to 13 are conceptual views showing an arrangement in which the image-forming optical system according to the present invention is incorporated into an objective optical system in a finder unit of an electronic camera. FIG. 11 is a perspective view showing the external appearance of an electronic camera 40 as viewed from the front side thereof. FIG. 12 is a perspective view of the electronic camera 40 as viewed from the rear side thereof. FIG. 13 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter, an infrared cutoff filter, etc. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera 40 may be arranged in the form of a silver halide camera in which a silver halide film is disposed in place of the CCD 49.

Furthermore, an objective optical system 53 for the finder is placed in the optical path 44 for the finder. The objective optical system 53 for the finder comprises a cover lens 54, a first prism 10, an aperture stop 2, a second prism 20, and a focusing lens 66. An image-forming optical system according to the present invention is used as an image-forming optical system including the cover lens 54 or the first prism 10 through the second prism 20. The cover lens 54 used as a cover member is a lens having a negative power to enlarge the field angle. The focusing lens 66, which is placed behind the second prism 20, can be moved in the forward and backward directions along the optical axis to adjust the position thereof. The focusing lens 66 is used for focusing the objective optical system 53 for the finder. An object image produced on an image-formation plane 67 by the objective optical system 53 for the finder is formed on a view frame 57 of a Porro prism 55, which is an image-erecting member. It should be noted that the view frame 57 is placed between a first reflecting surface 56 and second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 for photography in the electronic camera 40 shown in FIG. 13, it should be noted that the objective optical system 48 for photography may be formed by using not only a refracting coaxial optical system but also any type of image-forming optical systems according to the present invention, which comprise two prisms 10 and 20.

Figure 14:
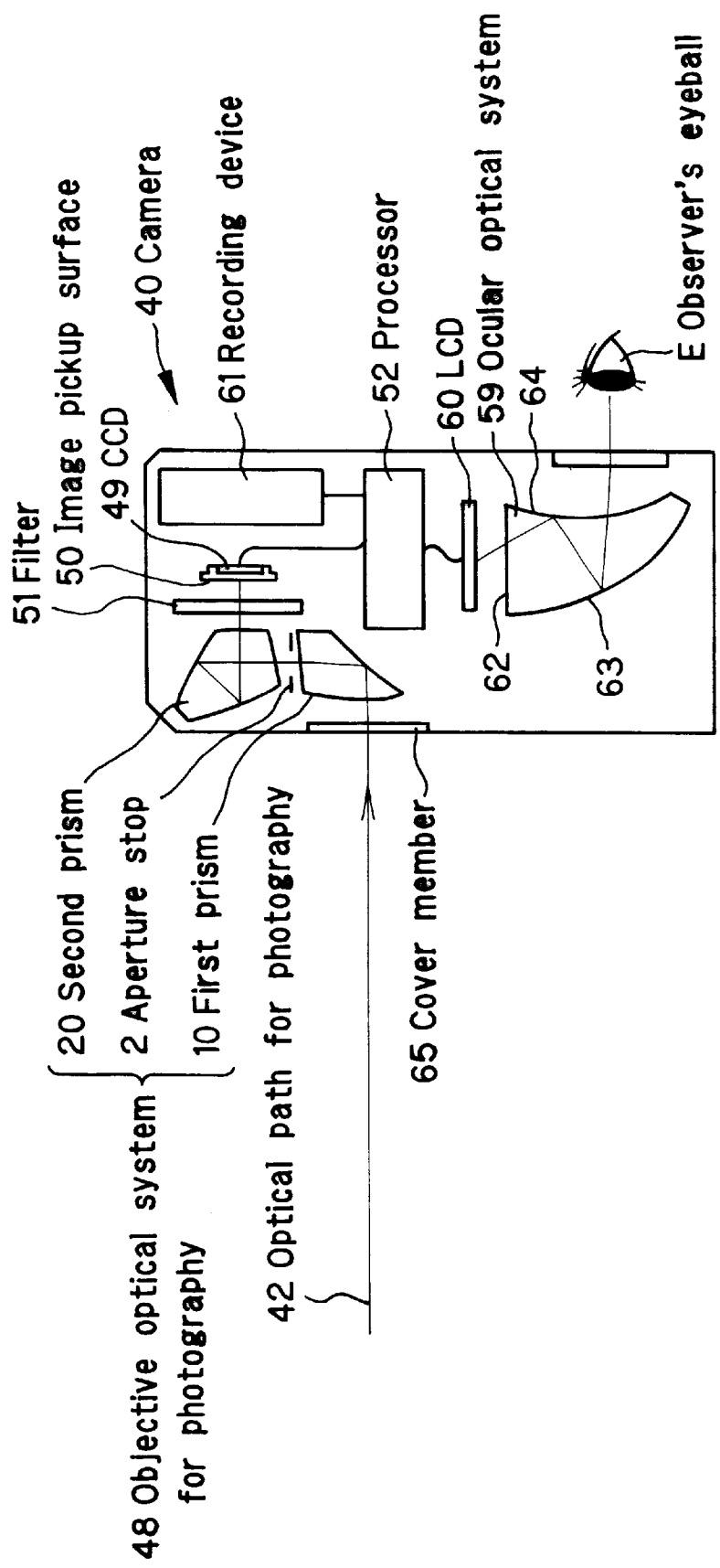
FIG. 14 is a conceptual view of another electronic camera to which an image-forming optical system according to the present invention is applied.

FIG. 14 is a conceptual view showing an arrangement in which an image-forming optical system according to the present invention is incorporated into an objective optical system 48 in a photography part of an electronic camera 40. In this example, an image-forming optical system according to the present invention that comprises a first prism 10, an aperture stop 2, and a second prism 20 is used in the objective optical system 48 for photography, which is placed in an optical path 42 for photography. An object image produced by the objective optical system 48 for photography is formed on an image pickup surface 50 of a CCD 49 through a filter 51, e.g. a low-pass filter, an infrared cutoff filter, etc. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism. In this example, the ocular optical system 59 has three surfaces, i.e. an entrance surface 62, a reflecting surface 63, and a surface 64 serving as both reflecting and refracting surfaces. At least one of the two surfaces 63 and 64 having a reflecting action, preferably each of them, is formed from a plane-symmetry free-form surface with only one plane of symmetry that gives a power to a light beam and corrects decentration aberrations. The only one plane of symmetry is formed in approximately the same plane as the only one plane of symmetry of the plane-symmetry free-form surfaces of the prisms 10 and 20 in the objective optical system 48 for photography. The objective optical system 48 for photography may include another lens (positive or negative lens) as a constituent element on the object or image side of the prisms 10 and 20 or therebetween.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

The surface closest to the object side in the image-forming optical system according to the present invention may be used as a cover member instead of providing a cover member separately. In this example, the entrance surface of the first prism 10 is the closest to the object side in the image-forming optical system. In such a case, however, because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 15A:
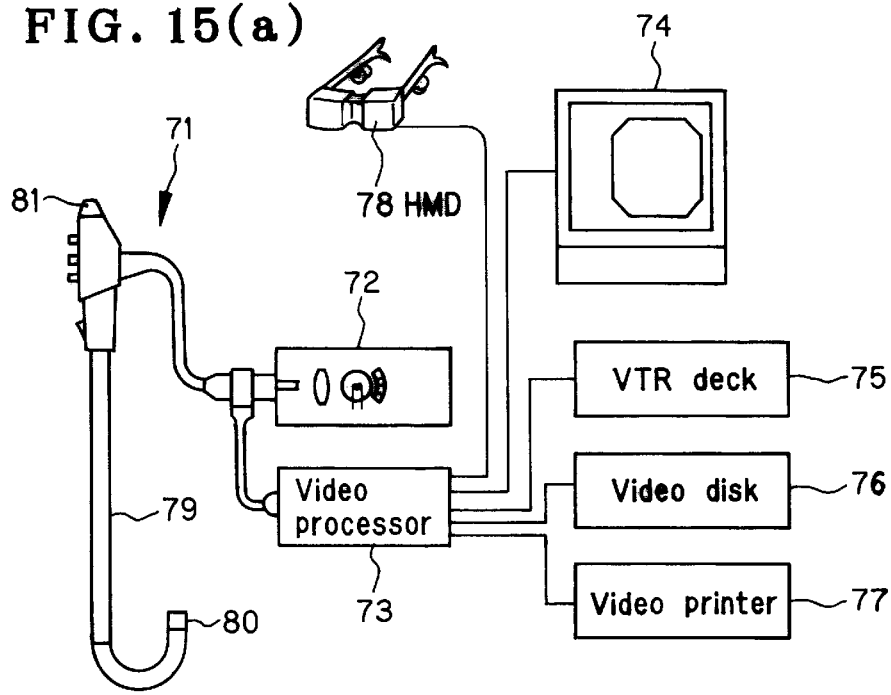
FIGS. 15(a) and 15(b) are conceptual views of a video endoscope system to which an image-forming optical system according to the present invention is applied.
Figure 15B:
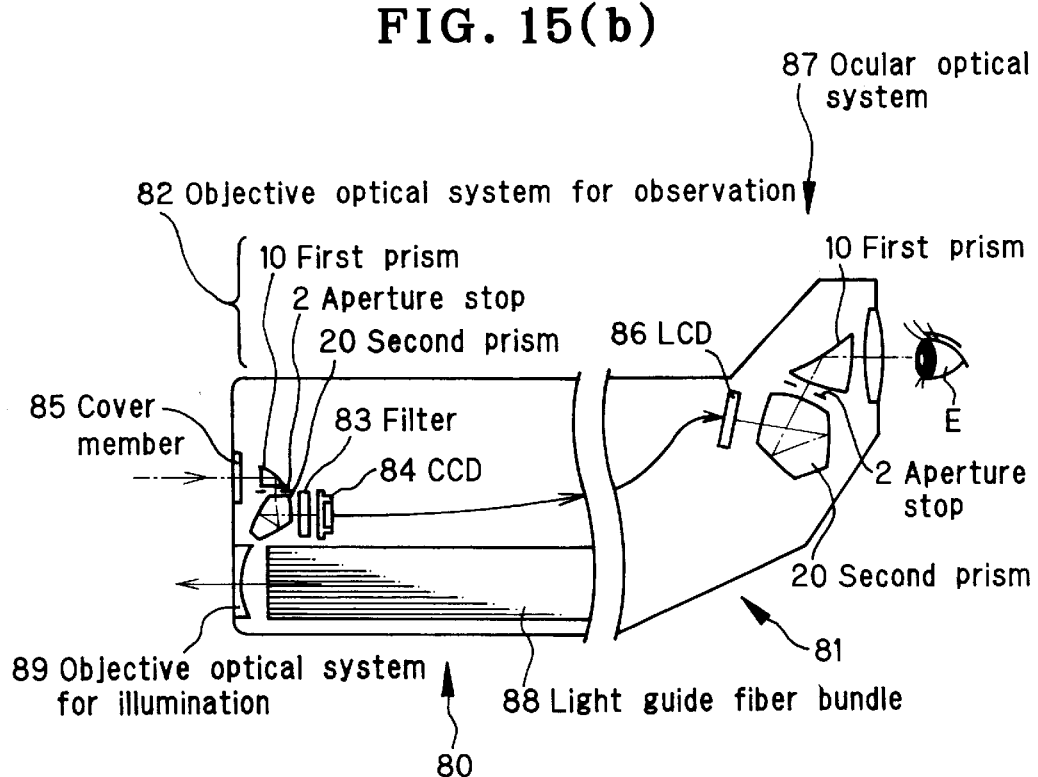

FIGS. 15(a) and 15(b) are conceptual views showing an arrangement in which an image-forming optical system according to the present invention is incorporated into an objective optical system 82 in an observation system of a video endoscope system, and an image-forming optical system according to the present invention is also incorporated into an ocular optical system 87 in the observation system of the video endoscope system. In this example, the objective optical system 82 in the observation system uses an image-forming optical system according to the present invention that comprises a first prism 10, an aperture stop 2, and a second prism 20, and the ocular optical system 87 also uses an image-forming optical system according to the present invention that comprises a first prism 10, an aperture stop 2, and a second prism 20. As shown in FIG. 15(a), the video endoscope system includes a video endoscope 71, a light source unit 72 for supplying illuminating light, a video processor 73 for executing processing of signals associated with the video endoscope 71, a monitor 74 for displaying video signals output from the video processor 73, a VTR deck 75 and a video disk 76, which are connected to the video processor 73 to record video signals and so forth, and a video printer 77 for printing out video signals in the form of images. The video endoscope system further includes a head-mounted image display apparatus (HMD) 78. The video endoscope 71 has an insert part 79 with a distal end portion 80 and an eyepiece part 81. The distal end portion 80 and the eyepiece part 81 are arranged as shown in FIG. 15(b). A light beam from the light source unit 72 passes through a light guide fiber bundle 88 and illuminates a part to be observed through an objective optical system 89 for illumination. Light from the part to be observed enters the objective optical system 82 for observation through a cover member 85. Thus, an object image is formed by the objective optical system 82. The object image is formed on the image pickup surface of a CCD 84 through a filter 83, e.g. a low-pass filter, an infrared cutoff filter, etc. Furthermore, the object image is converted into a video signal by the CCD 84. The video signal is displayed directly on the monitor 74 by the video processor 73, which is shown in FIG. 15(a). In addition, the video signal is recorded in the VTR deck 75 and on the video disk 76 and also printed out in the form of an image from the video printer 77. In addition, the object image is displayed on the image display device of the HMD 78, thereby allowing a person wearing the HMD 78 to observe the displayed image. At the same time, the video signal converted by the CCD 84 is displayed in the form of an electronic image on a liquid crystal display device (LCD) 86 in the eyepiece part 81. The displayed image is led to an observer's eyeball E through the ocular optical system 87, which is formed from an image-forming optical system according to the present invention.

The endoscope arranged as stated above can be constructed with a minimal number of optical members. Accordingly, a high-performance and low-cost endoscope can be realized. Moreover, because the constituent elements of the objective optical system 82 are arranged in series in the direction of the longitudinal axis of the endoscope, the above-described advantageous effects can be obtained without hindering the achievement of a reduction in the diameter of the endoscope.

Figure 16:
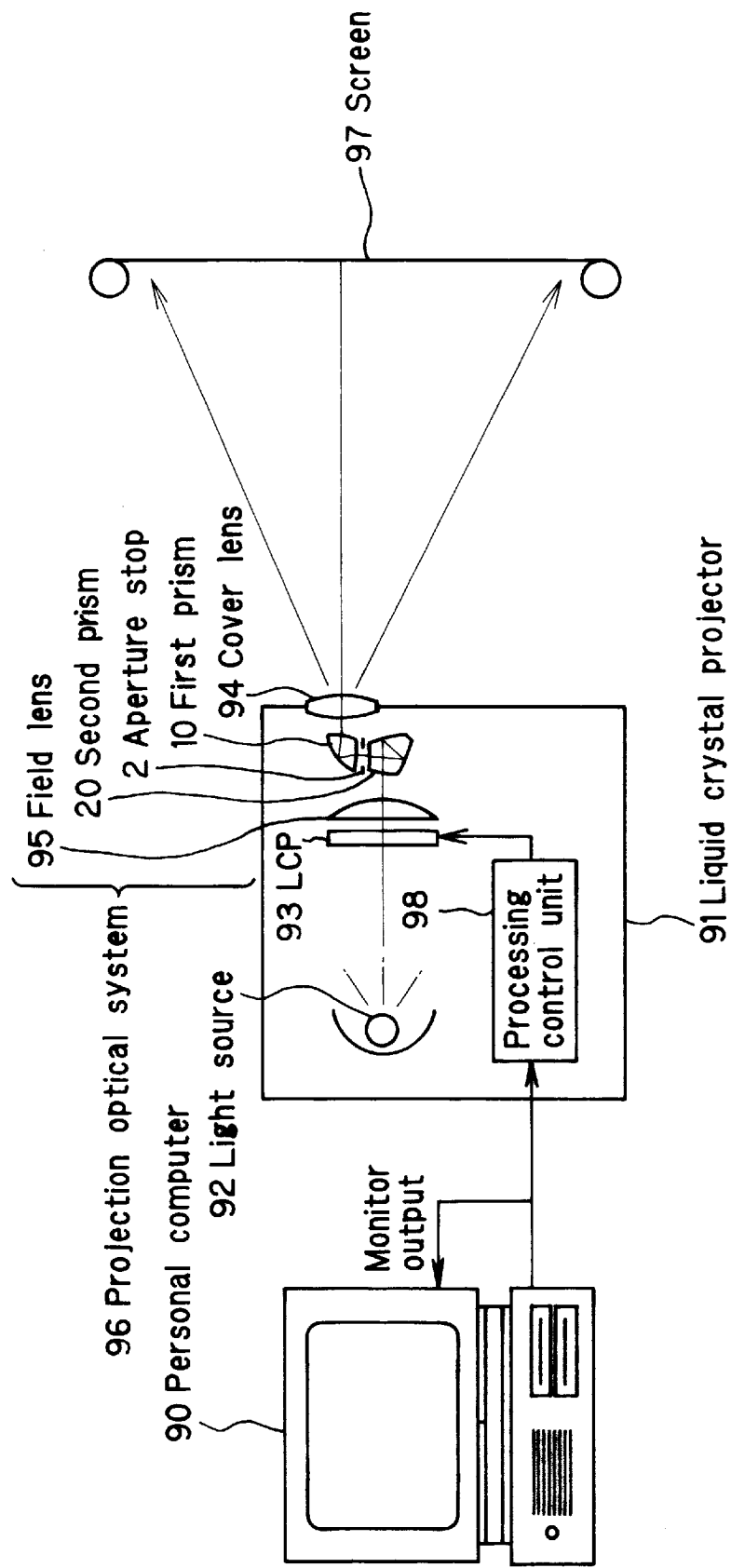
FIG. 16 is a conceptual view showing an arrangement in which an image-forming optical system according to the present invention is applied to a projection optical system of a presentation system.

Incidentally, the image-forming optical system can also be used as a projection optical system by reversing the optical path. FIG. 16 is a conceptual view showing an arrangement in which a prism optical system according to the present invention is used in a projection optical system 96 of a presentation system formed by combining together a personal computer 90 and a liquid crystal projector 91. In this example, an image-forming optical system according to the present invention that comprises a first prism 10, an aperture stop 2, and a second prism 20 is used in the projection optical system 96. Referring to FIG. 16, image and manuscript data prepared on the personal computer 90 is branched from a monitor output and delivered to a processing control unit 98 in the liquid crystal projector 91. In the processing control unit 98 of the liquid crystal projector 91, the input data is processed and output to a liquid crystal panel (LCP) 93. The liquid crystal panel 93 displays an image corresponding to the input image data. Light from a light source 92 is applied to the liquid crystal panel 93. The amount of light transmitted by the liquid crystal panel 93 is determined by the gradation of the image displayed on the liquid crystal panel 93. Light from the liquid crystal panel 93 is projected on a screen 97 through a projection optical system 96 comprising a field lens 95 placed immediately in front of the liquid crystal panel 93, an image-forming optical system according to the present invention that comprises a first prism 10, an aperture stop 2, and a second prism 20, and a cover lens 94 which is a positive lens.

The projector arranged as stated above can be constructed with a minimal number of optical members. Accordingly, a high-performance and low-cost projector can be realized. In addition, the projector can be constructed in a compact form.

Figure 17:
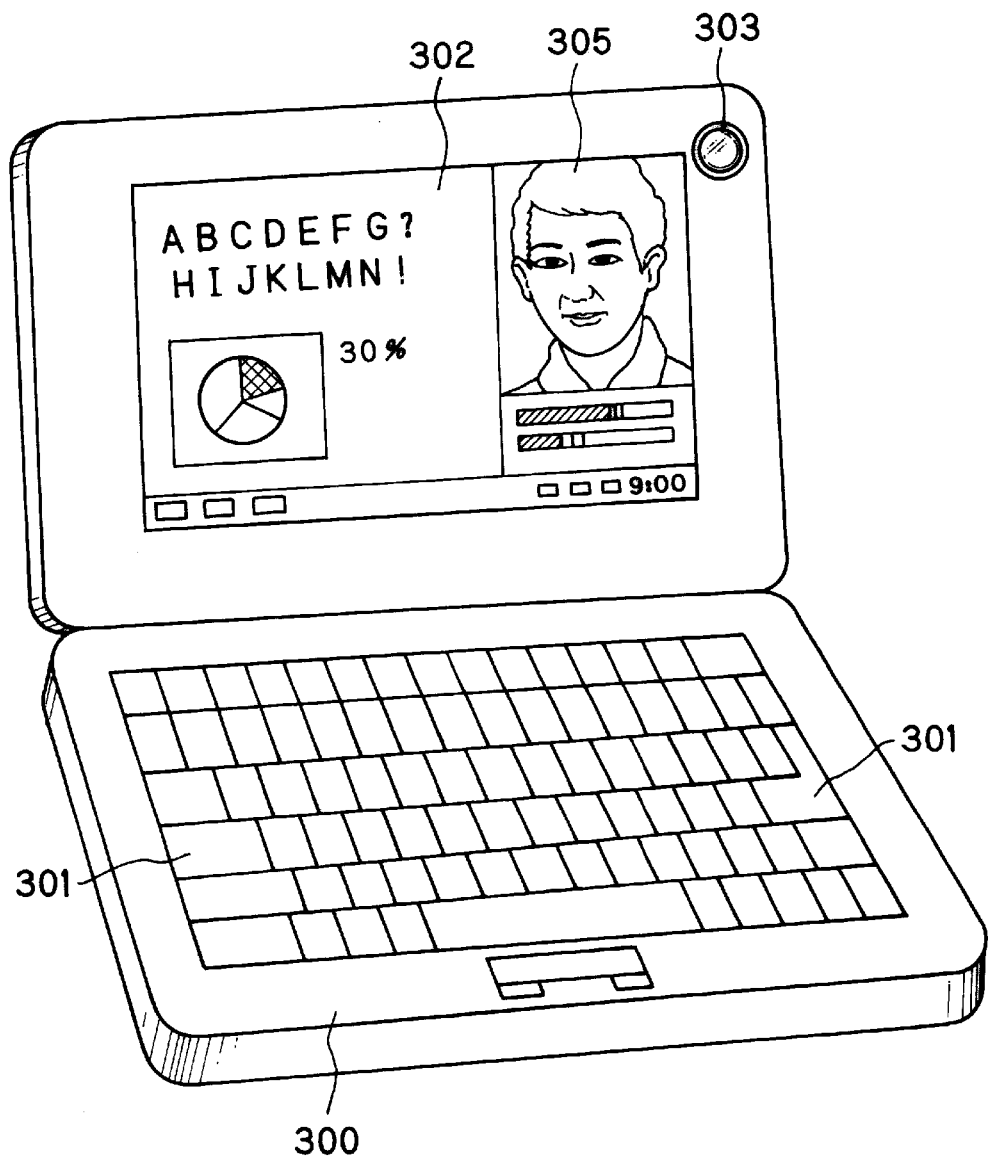
FIG. 17 is a perspective view showing a personal computer incorporating an image-forming optical system according to the present invention as an objective optical system, as viewed from the front side thereof, in a state where a cover is open.
Figure 18:
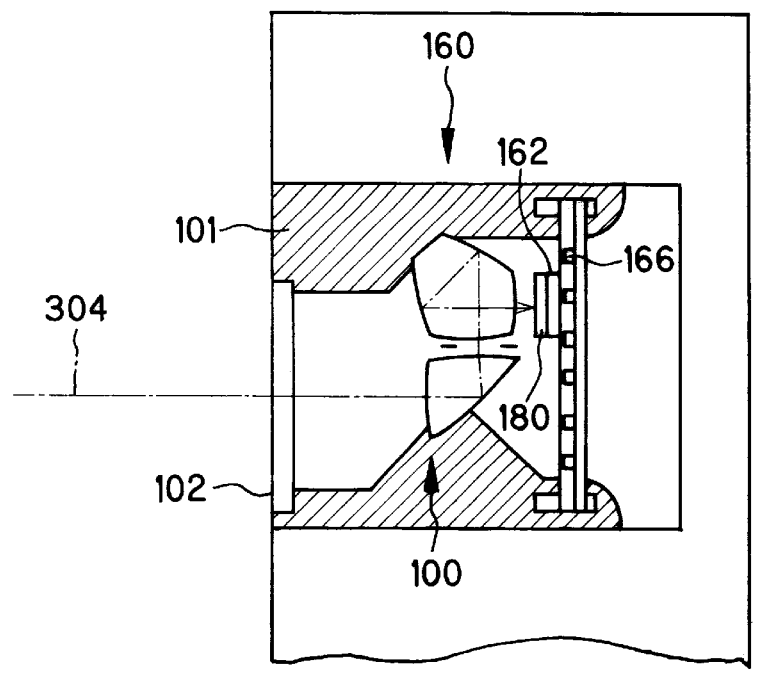
FIG. 18 is a sectional view of a photographic optical system of the personal computer shown in FIG. 17.
Figure 19:
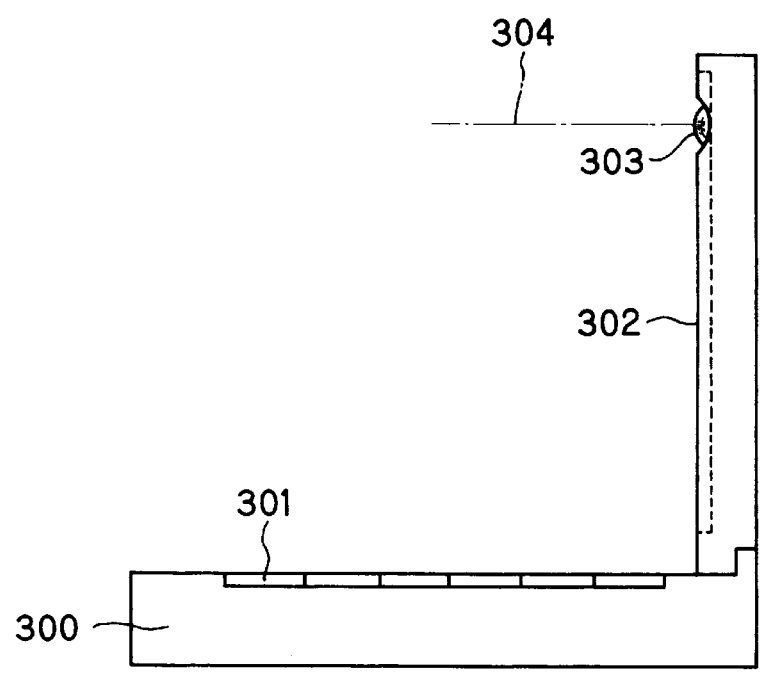
FIG. 19 is a side view of the personal computer in the state shown in FIG. 17.

FIGS. 17 to 19 are conceptual views showing an arrangement in which an image-forming optical system according to the present invention is incorporated into a personal computer as an example of information processing apparatus.

FIG. 17 is a perspective view of a personal computer 300 as seen from the front side thereof in a state where a cover thereof is open. FIG. 18 is a sectional view of a photographic optical system 303 of the personal computer 300. FIG. 19 is a side view of the personal computer 300 in the state shown in FIG. 17. As shown in FIGS. 17 to 19, the personal computer 300 has a keyboard 301 used by an operator to input information externally, and information processing and recording devices (not shown). The personal computer 300 further has a monitor 302 for displaying information for the operator, and a photographic optical system 303 for taking a photograph of the operator or an image of a surrounding object. In this case, the monitor 302 may be a transmissive liquid crystal display, which is illuminated from the rear side by a backlight (not shown), or a reflective liquid crystal display, which displays information by reflecting light applied from the front side thereof. The monitor 302 may also be a CRT display or the like. Although the photographic optical system 303 is incorporated in a portion at the top right corner of the monitor 302, the position of the photographic optical system 303 is not necessarily limited to the illustrated position. The photographic optical system 303 may be provided at any position around the monitor 302 or around the keyboard 301.

The photographic optical system 303 has, in a photographic optical path 304, an objective optical system 100 comprising an image-forming optical system according to the present invention, and an image pickup chip 162 for receiving an object image. These constituent elements of the photographic optical system 303 are incorporated in the personal computer 300.

The image pickup chip 162 has additionally an IR cutoff filter 180 integrally stuck thereon to form an image pickup unit 160. Thus, the image pickup unit 160 can be mounted in a one-touch simple operation by fitting it to the rear end of a lens frame 101 of the objective optical system 100. Accordingly, it is unnecessary to perform centering of the objective optical system 100 and the image pickup chip 162 and adjustment of surface separation. Therefore, the assembly is easy. A cover glass 102 is disposed at the distal end of the lens frame 101 to protect the objective optical system 100.

An object image received by the image pickup chip 162 is input to a processing device of the personal computer 300 through terminals 166 and displayed on the monitor 302 in the form of an electronic image. FIG. 17 shows a photographed image 305 of the operator as an example of the electronic image. The image 305 can also be transferred so as to be displayed on a personal computer of the person on the other end of a communication line from a remote place through the processing device via the internet or telephone lines.

Figure 20A:
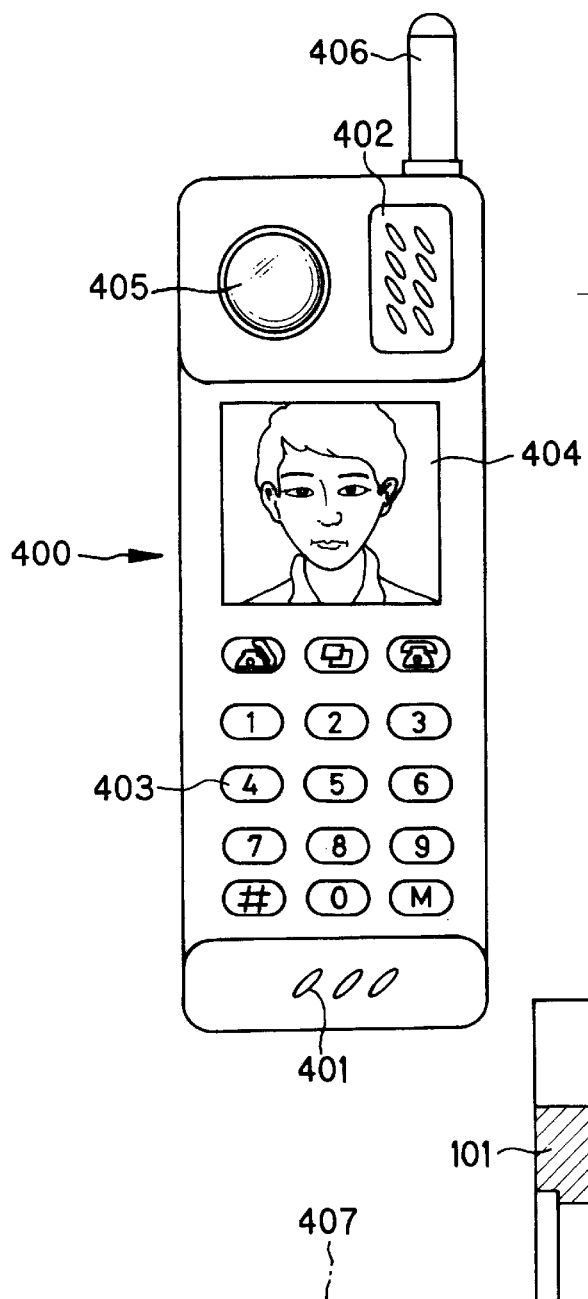
FIG. 20(a) is a front view of a portable telephone incorporating an image-forming optical system according to the present invention as an objective optical system.
Figure 20B:
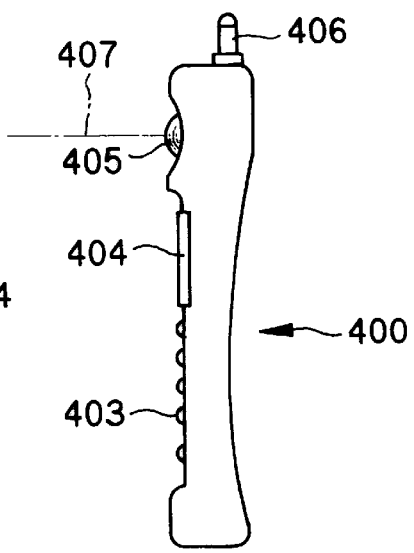
FIG. 20(b) is a side view of the portable telephone shown in FIG. 20(a).
Figure 20C:
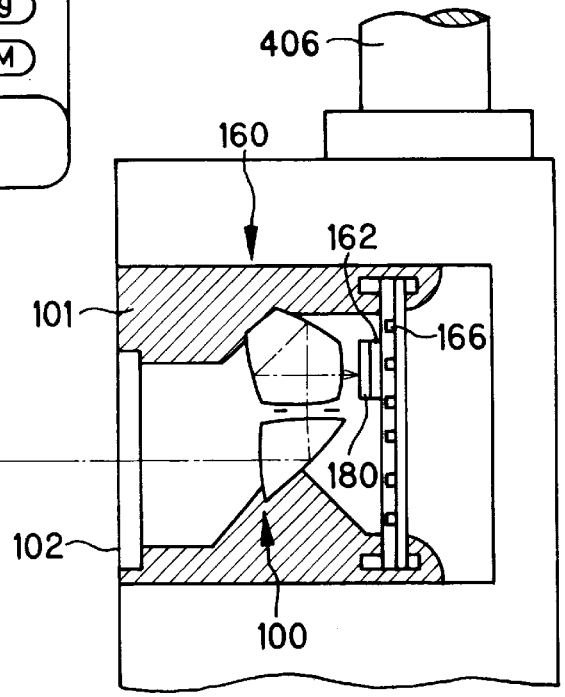
FIG. 20(c) is a sectional view of a photographic optical system of the portable telephone shown in FIG. 20(a).

FIGS. 20(a) to 20(c) show a telephone as another example of information processing apparatus, particularly an example in which an image-forming optical system according to the present invention is incorporated in a portable telephone, which is handy to carry.

FIG. 20(a) is a front view of a portable telephone 400. FIG. 20(b) is a side view thereof. FIG. 20(c) is a sectional view of a photographic optical system 405. As shown in FIGS. 20(a) to 20(c), the portable telephone 400 has a microphone unit 401 for inputting the voice of the operator as information and a speaker unit 402 for outputting the voice of the person on the other end of a communication line. The portable telephone 400 further has input keys 403 used by the operator to input information, and a monitor 404 for displaying information, e.g. a photographed image of the operator or the person on the other end of the line and a telephone number. In addition, the portable telephone 400 has a photographic optical system 405, an antenna 406 for transmitting and receiving electric waves for telephonic communication, and a processing unit (not shown) for processing image information, communication information, input signals, etc. The monitor 404 is a liquid crystal display device. The layout of the constituent elements shown in the figures is not necessarily limited to the illustrated layout. The photographic optical system 405 has an objective optical system 100 comprising an image-forming optical system according to the present invention, and an image pickup chip 162 for receiving an image. The objective optical system 100 and the image pickup chip 162 are placed in a photographic optical path 407 and incorporated in the portable telephone 400.

The image pickup chip 162 has additionally an IR cutoff filter 180 integrally stuck thereon to form an image pickup unit 160. Thus, the image pickup unit 160 can be mounted in a one-touch simple operation by fitting it to the rear end of a lens frame 101 of the objective optical system 100. Accordingly, it is unnecessary to perform centering of the objective optical system 100 and the image pickup chip 162 and adjustment of surface separation. Therefore, the assembly is easy. A cover glass 102 is disposed at the distal end of the lens frame 101 to protect the objective optical system 100.

An object image received by the image pickup chip 162 is input to the processing unit (not shown) through terminals 166 and displayed in the form of an electronic image on the monitor 404 or on the monitor of a person on the other end of a communication line. Alternatively, the object image is displayed on both the monitors. The processing unit further includes a signal processing function to convert information concerning the object image received by the image pickup chip 162 into a transmittable signal when the image is to be transmitted to the person on the other end of the communication line.

As will be clear from the foregoing description, the present invention makes it possible to provide a high-performance and low-cost image-forming optical system with a minimal number of constituent optical elements. In addition, it is possible to provide a high-performance image-forming optical system that is made extremely thin, particularly in a direction perpendicular to an image pickup device, by folding an optical path using only three reflecting surfaces.

I claim:

1. An image-forming optical system having a positive refracting power as a whole for forming an object image, said image-forming optical system comprising, in order from an object side thereof:

a front unit including at least a first prism;

an aperture stop; and a rear unit including a second prism;

wherein said first prism and said second prism are each formed from a medium having a refractive index (n) larger than 1.3 (n>1.3), and wherein no intermediate image is formed;

said first prism having three optical functional surfaces transmitting or reflecting a light beam;

wherein when said three optical functional surfaces are defined as a first-first surface, a first-second surface, and a first-third surface, respectively, said first-first surface allows a light-beam from an object side thereof to enter said first prism through it, said first-second surface reflects the light beam entering through said first-first surface within said first prism, and said first-third surface allows the light beam reflected from said first-second surface to exit said first prism through it;

said second prism having four optical functional surfaces transmitting or reflecting a light beam;

wherein when said four optical functional surfaces are defined as a second-first surface, a second-second surface, a second-third surface, and a second-fourth surface, respectively, said second-first surface allows a light beam from an object side thereof to enter said second prism through it, said second-second surface reflects the light beam entering through said second-first surface within said second prism, said second-third surface reflects the light beam reflected from said second-second surface within said second prism, and said second-fourth surface allows the light beam reflected from said second-third surface to exit said second prism through it, and wherein said second-first surface and said second-second surface are disposed to face each other across said medium, and said second-third surface and said second-fourth surface are disposed to face each other across said medium, and further an optical path connecting said second-first surface and said second-second surface intersects an optical path connecting said second-third surface and said second-fourth surface;

wherein said first-second surface of said first prism has a rotationally asymmetric surface configuration that gives a power to a light beam and corrects aberrations due to decentration; and wherein said second-second surface and said second-third surface of said second prism have a curved surface configuration that gives a power to a light beam, said curved surface configuration being a rotationally asymmetric surface configuration that corrects aberrations due to decentration.

2. An image-forming optical system according to claim 1, wherein three reflecting surfaces of said first prism and said second prism are plane-symmetry free-form surfaces each having only one plane of symmetry.

3. An image-forming optical system having a positive refracting power as a whole for forming an object image, said image-forming optical system comprising, in order from an object side thereof:

a front unit including at least a first prism;

an aperture stop; and a rear unit including a second prism;

wherein said first prism and said second prism are each formed from a medium having a refractive index (n) larger than 1.3 (n>1.3), and wherein no intermediate image is formed;

said first prism having three optical functional surfaces transmitting or reflecting a light beam;

wherein when said three optical functional surfaces are defined as a first-first surface, a first-second surface, and a first-third surface, respectively, said first-first surface allows a light beam from an object side thereof to enter said first prism through it, said first-second surface reflects the light beam entering through said first-first surface within said first prism, and said first-third surface allows the light beam reflected from said first-second surface to exit said first prism through it;

said second prism having four optical functional surfaces transmitting or reflecting a light beam;

wherein when said four optical functional surfaces are defined as a second-first surface, a second-second surface, a second-third surface, and a second-fourth surface, respectively, said second-first surface allows a light beam from an object side thereof to enter said second prism through it, said second-second surface reflects the light beam entering through said second-first surface within said second prism, said second-third surface reflects the light beam reflected from said second-second surface within said second prism, and said second-fourth surface allows the light beam reflected from said second-third surface to exit said second prism through it, and wherein said second-first surface and said second-second surface are disposed to face each other across said medium, and said second-third surface and said second-fourth surface are disposed to face each other across said medium, and further an optical path connecting said second-first surface and said second-second surface intersects an optical path connecting said second-third surface and said second-fourth surface;

wherein said first-second surface of said first prism has a rotationally asymmetric surface configuration that gives a power to a light beam and corrects aberrations due to decentration; and wherein said second-second surface and said second-third surface of said second prism have a curved surface configuration that gives a power to a light beam, said curved surface configuration being a rotationally asymmetric surface configuration that corrects aberrations due to decentration, wherein when a decentration direction of said image-forming optical system is a Y-axis direction, and a plane parallel to an axial principal ray is a YZ-plane, and further a direction perpendicularly intersecting the YZ-plane is an X-axis direction, the following condition are satisfied:

$$-0.5 < P1x/Px < 0.4 \quad (1\text{-}1)$$

$$-0.5 < P1y/Py < 0.4 \quad (2\text{-}1)$$

where P1x is a power in the X-axis direction of said front unit including said first prism; P1y is a power in the Y-axis direction of said front unit; Px is a power in the X-axis direction of said image-forming optical system; and Py is a power in the Y-axis direction of said image-forming optical system, and wherein Px and Py are powers of an optical system position where a first image is formed.

4. An image-forming optical system having a positive refracting power as a whole for forming an object image, said image-forming optical system comprising, in order from an object side thereof:

a front unit including at least a first prism;

an aperture stop; and a rear unit including a second prism;

wherein said first prism and said second prism are each formed from a medium having a refractive index (n) larger than 1.3 (n>1.3), and wherein no intermediate image is formed;

said first prism having three optical functional surfaces transmitting or reflecting a light beam;

wherein when said three optical functional surfaces are defined as a first-first surface, a first-second surface, and a first-third surface, respectively, said first-first surface allows a light beam from an object side thereof to enter said first prism through it, said first-second surface reflects the light beam entering through said first-first surface within said first prism, and said first-third surface allows the light beam reflected from said first-second surface to exit said first prism through it;

said second prism having four optical functional surfaces transmitting or reflecting a light beam;

wherein when said four optical functional surfaces are defined as a second-first surface, a second-second surface, a second-third surface, and a second-fourth surface, respectively, said second-first surface allows a light beam from an object side thereof to enter said second prism through it, said second-second surface reflects the light beam entering through said second-first surface within said second prism, said second-third surface reflects the light beam reflected from said second-second surface within said second prism, and said second-fourth surface allows the light beam reflected from said second-third surface to exit said second prism through it, and wherein said second-first surface and said second-second surface are disposed to face each other across said medium, and said second-third surface and said second-fourth surface are disposed to face each other across said medium, and further an optical path connecting said second-first surface and said second-second surface intersects an optical path connecting said second-third surface and said second-fourth surface;

wherein said first-second surface of said first prism has a rotationally asymmetric surface configuration that gives a power to a light beam and corrects aberrations due to decentration; and wherein said second-second surface and said second-third surface of said second prism have a curved surface configuration that gives a power to a light beam, said curved surface configuration being a rotationally asymmetric surface configuration that corrects aberrations due to decentration, wherein when a decentration direction of said image-forming optical system is a Y-axis direction, and a plane parallel to an axial principal ray is a YZ-plane, and further a direction perpendicularly intersecting the YZ-plane is an X-axis direction, the following conditions are satisfied:

$$0.3 < P2x/Px < 2.0 \quad (3\text{-}1)$$

$$0.3 < P2y/Py < 2.0 \quad (4\text{-}1)$$

where P2x is a power in the X-axis direction of said rear unit including said second prism; P2y is a power in the Y-axis direction of said rear unit; Px is a power in the X-axis direction of said image-forming optical system; and Py is a power in the Y-axis direction of said image-forming optical system, and wherein Px and Py are powers of an optical system position where a first image is formed.

5. An image-forming optical system according to claim 1, wherein the following condition is satisfied:

$$70° < \theta < 110° \quad (5\text{-}1)$$

where θ is an angle formed between an axial principal ray incident on said first-second surface and the axial principal ray reflected therefrom.

6. An image-forming optical system having a positive refracting power as a whole for forming an object image, said image-forming optical system comprising, in order from an object side thereof:

a front unit including at least a first prism;

an aperture stop; and a rear unit including a second prism;

wherein said first prism and said second prism are each formed from a medium having a refractive index (n) larger than 1.3 (n>1.3), and wherein no intermediate image is formed;

said first prism having three optical functional surfaces transmitting or reflecting a light beam;

wherein when said three optical functional surfaces are defined as a first-first surface, a first-second surface, and a first-third surface, respectively, said first-first surface allows a light beam from an object side thereof to enter said first prism through it, said first-second surface reflects the light beam entering through said first-first surface within said first prism, and said first-third surface allows the light beam reflected from said first-second surface to exit said first prism through it;

aid second prism having four optical functional surfaces transmitting or reflecting a light beam;

wherein when said four optical functional surfaces are defined as a second-first surface, a second-second surface, a second-third surface, and a second-fourth surface, respectively, said second-first surface allows a light beam from an object side thereof to enter said second prism through it, said second-second surface reflects the light beam entering through said second-first surface within said second prism, said second-third surface reflects the light beam reflected from said second-second surface within said second prism, and said second-fourth surface allows the light beam reflected from said second-third surface to exit said second prism through it, and wherein said second-first surface and said second-second surface are disposed to face each other across said medium, and said second-third surface and said second-fourth surface are disposed to face each other across said medium, and further an optical path connecting said second-first surface and said second-second surface intersects an optical path connecting said second-third surface and said second-fourth surface;

wherein said first-second surface of said first prism has a rotationally asymmetric surface configuration that gives a power to a light beam and corrects aberrations due to decentration; and wherein said second-second surface and said second-third surface of said second prism have a curved surface configuration that gives a power to a light beam, said curved surface configuration being a rotationally asymmetric surface configuration that corrects aberrations due to decentration, wherein the following condition is satisfied:

$$0.5 < D/f < 2.5 \quad (6\text{-}1)$$

where D is a thickness of said image-forming optical system, and f is a mean focal length of said image-forming optical system, wherein said thickness D of said image-forming optical system is a thickness of said image-forming optical system measured from an image pickup device in a direction perpendicular to the image pickup device, which is a distance from a forwardmost ray position among rays within said image-forming optical system to an image plane, and said mean focal length f is defined as f=(fx+fy)/2, where fx is a focal length in the x-axis direction of said image-forming optical system, and fy is a focal length in the Y-axis direction of said image-forming optical system.

7. An image-forming optical system having a positive refracting power as a whole for forming an object image, said image-forming optical system comprising, in order from an object side thereof:

a front unit including at least a first prism;

an aperture stop; and a rear unit including a second prism;

wherein said first prism and said second prism are each formed from a medium having a refractive index (n) larger than 1.3 (n>1.3), and wherein no intermediate image is formed;

said first prism having three optical functional surfaces transmitting or reflecting a light beam;

wherein when said three optical functional surfaces are defined as a first-first surface, a first-second surface, and a first-third surface, respectively, said first-first surface allows a light beam from an object side thereof to enter said first prism through it, said first-second surface reflects the light beam entering through said first-first surface within said first prism, and said first-third surface allows the light beam reflected from said first-second surface to exit said first prism through it;

said second prism having four optical functional surfaces transmitting or reflecting a light beam;

wherein when said four optical functional surfaces are defined as a second-first surface, a second-second surface, a second-third surface, and a second-fourth surface, respectively, said second-first surface allows a light beam from an object side thereof to enter said second prism through it, said second-second surface reflects the light beam entering through said second-first surface within said second prism, said second-third surface reflects the light beam reflected from said second-second surface within said second prism, and said second-fourth surface allows the light beam reflected from said second-third surface to exit said second prism through it, and wherein said second-first surface and said second-second surface are disposed to face each other across said medium, and said second-third surface and said second-fourth surface are disposed to face each other across said medium, and further an optical path connecting said second-first surface and said second-second surface intersects an optical path connecting said second-third surface and said second-fourth surface;

wherein said first-second surface of said first prism has a rotationally asymmetric surface configuration that gives a power to a light beam and corrects aberrations due to decentration; and wherein said second-second surface and said second-third surface of said second prism have a curved surface configuration that gives a power to a light beam, said curved surface configuration being a rotationally asymmetric surface configuration that corrects aberrations due to decentration, wherein the following condition is satisfied:

$$1 < SD1/f < 3.0 \tag{7-1}$$

where SD1 is an optical path length of an axial principal ray from said first-second surface of said front unit, which is a reflecting surface, to said aperture stop, and f is a mean focal length of said image-forming optical system, wherein said mean focal length f is defined as $f=(fx+fy)/2$, where fx is a focal length in the X-axis direction of said image-forming optical system, and fy is a focal length in the Y-axis direction of said image-forming optical system.

8. An image-forming optical system having a positive refracting power as a whole for forming an object image, said image-forming optical system comprising, in order from an object side thereof:

a front unit including at least a first prism;

an aperture stop; and a rear unit including a second prism;

wherein said first prism and said second prism are each formed from a medium having a refractive index (n) larger than 1.3 (n>1.3), and wherein no intermediate image is formed;

said first prism having three optical functional surfaces transmitting or reflecting a light beam;

wherein when said three optical functional surfaces are defined as a first-first surface, a first-second surface, and a first-third surface, respectively, said first-first surface allows a light beam from an object side thereof to enter said first prism through it, said first-second surface reflects the light beam entering through said first-first surface within said first prism, and said first-third surface allows the light beam reflected from said first-second surface to exit said first prism through it;

said second prism having four optical functional surfaces transmitting or reflecting a light beam;

wherein when said four optical functional surfaces are defined as a second-first surface, a second-second surface, a second-third surface, and a second-fourth surface, respectively, said second-first surface allows a light beam from an object side thereof to enter said second prism through it, said second-second surface reflects the light beam entering through said second-first surface within said second prism, said second-third surface reflects the light beam reflected from said second-second surface within said second prism, and said second-fourth surface allows the light beam reflected from said second-third surface to exit said second prism through it, and wherein said second-first surface and said second-second surface are disposed to face each other across said medium, and said second-third surface and said second-fourth surface are disposed to face each other across said medium, and further an optical path connecting said second-first surface and said second-second surface intersects an optical path connecting said second-third surface and said second-fourth surface;

wherein said first-second surface of said first prism has a rotationally asymmetric surface configuration that gives a power to a light beam and corrects aberrations due to decentration; and wherein said second-second surface and said second-third surface of said second prism have a curved surface configuration that gives a power to a light beam, said curved surface configuration being a rotationally asymmetric surface configuration that corrects aberrations due to decentration, wherein either of the following conditions is satisfied:

$$0.5 < SD2/f < 3.0 \tag{8-1}$$

$$2.0 < SD3/f < 6.0 \tag{9-1}$$

where SD2 is an optical path length of an axial principal ray from a first surface of said front unit that is closest to the object side to said aperture stop; SD3 is an optical path length of the axial principal ray from said aperture stop to a final surface of said rear unit that is closest to the image side; and f is a mean focal length of said image-forming optical system, wherein said mean focal length f is defined as f=(fx+fy)/2, where fx is a focal length in the X-axis direction of said image-forming optical system, and fy is a focal length in the Y-axis direction of said image-forming optical system.

9. An image-forming optical system according to claim 1, wherein at least one optical element is placed on an object side of said first prism.

10. An image-forming optical system according to claim 1, wherein at least one optical element is placed between said first prism and said second prism.

11. An image-forming optical system according to claim 1, wherein at least one surface of said optical element has a rotationally asymmetric surface configuration that corrects aberrations due to decentration.

12. An image-forming optical system according to claim 1, wherein said ear unit consists of said second prism.

13. An image-forming optical system according to claim 1 or 2, wherein the first prism in said front unit comprises a single mirror.

14. An image-forming optical system according to claim 1 or 2, wherein the second prism in said rear unit comprises two mirrors.

15. An image-forming optical system according to claim 1 or 2, wherein the first prism in said front unit comprises a single mirror, and the second prism in said rear unit comprises two mirrors.

16. A finder optical system comprising:
said image-forming optical system according to any one of claims 1, 3, 4, 6, 7 or 8, said image-forming optical system being provided as a finder objective optical system;
an image-erecting optical system for erecting an object image formed by said finder objective optical system; and
an ocular optical system.

17. An electronic camera apparatus comprising:
said image-forming optical system according to any one of claims 1, 3, 4, 6, 7 or 8;
an image pickup device placed in an image plane formed by said image-forming optical system;
a recording medium for recording image information received by said image pickup device; and
an image display device that receives image information from one of said recording medium and said image pickup device to form an image for observation.

18. An endoscope system comprising:
an observation system having said image-forming optical system according to any one of claims 1, 3, 4, 6, 7 or 8 and an image transmitting member for transmitting an image formed by said image-forming optical system along a longitudinal axis; and
an illumination system having an illuminating light source and an illuminating light transmitting member for transmitting illuminating light from said illuminating light source along said longitudinal axis.

19. A projector comprising:
a light source;
a display device; and
a projection optical system for projecting information displayed on said display device;
wherein said projection optical system has said image-forming optical system according to any one of claims 1, 3, 4, 6, 7 or 8.

20. A portable information terminal comprising:
an input unit for inputting information;
a display unit for displaying the information; and
an image pickup optical system for imaging an object;
wherein said image pickup optical system has said image-forming optical system according to any one of claims 1, 3, 4, 6, 7 or 8.

21. A portable telephone comprising:
an input unit for inputting information;
a display unit for displaying the information;
a voice input unit;
a voice output unit;
an antenna; and
an image pickup optical system for imaging an object;
wherein said image pickup optical system has said image-forming optical system according to any one of claims 1, 3, 4, 6, 7 or 8.

* * * * *